US007068657B2

(12) United States Patent
Keller-Tuberg

(10) Patent No.: US 7,068,657 B2
(45) Date of Patent: Jun. 27, 2006

(54) FACILITATING INVERSE MULTIPLEXING OVER ASYNCHRONOUS TRANSFER MODE VIA COMMUNICATION LINKS HAVING DISPARATE DATA TRANSMISSION RATES

(75) Inventor: Stefan Keller-Tuberg, Raleigh, NC (US)

(73) Assignee: Alcatel, Paris (FR)

( * ) Notice: Subject to any disclaimer, the term of this patent is extended or adjusted under 35 U.S.C. 154(b) by 926 days.

(21) Appl. No.: 10/051,490

(22) Filed: Jan. 18, 2002

(65) Prior Publication Data

US 2002/0154637 A1 Oct. 24, 2002

Related U.S. Application Data

(60) Provisional application No. 60/286,211, filed on Apr. 24, 2001.

(51) Int. Cl.
*H04L 12/28* (2006.01)

(52) U.S. Cl. .................. 370/394; 370/395.1; 370/428; 370/474; 370/535; 370/905

(58) Field of Classification Search ............... 370/471, 370/535, 905, 229, 235, 352, 395.1, 397, 370/394, 428, 474
See application file for complete search history.

(56) References Cited

U.S. PATENT DOCUMENTS

| | | | | |
|---|---|---|---|---|
| 5,608,733 | A * | 3/1997 | Vallee et al. ............... | 370/394 |
| 5,617,417 | A * | 4/1997 | Sathe et al. ................ | 370/394 |
| 5,875,192 | A * | 2/1999 | Cam et al. ................ | 370/395.7 |
| 6,134,246 | A * | 10/2000 | Cai et al. .................... | 370/474 |
| 6,222,858 | B1* | 4/2001 | Counterman ............... | 370/474 |
| 6,822,960 | B1* | 11/2004 | Manchester et al. ........ | 370/394 |
| 6,894,977 | B1* | 5/2005 | Vallee ..................... | 370/236.2 |

FOREIGN PATENT DOCUMENTS

| | | |
|---|---|---|
| WO | WO 99/39468 | 8/1999 |
| WO | WO 01/13624 A1 | 2/2001 |
| WO | WO 01/91383 A1 | 11/2001 |

OTHER PUBLICATIONS

Adiseshu, H. et al, "A Reliable and Scalable Striping Protocol", Computer Communication Review, Association for Computing Machinery, New York, US, vol. 26, No. 4, Oct. 1996, pp. 131-141, XP001031957.

Khotimsky D.A. "A Packet Resequencing Protocol for Fault-Tolerant Multipath Transmission with Non-Uniform Traffic Splitting", 1999 IEEE Global Telecommunications Conference. '99. Seamless Interconnection for Universal Services, Rio de Janeiro, Brazil, Dec. 5-9, 1999. vol. 2,p. 1283-1289 XP001016916.

* cited by examiner

*Primary Examiner*—Steven Nguyen
*Assistant Examiner*—Roberta Shand
(74) *Attorney, Agent, or Firm*—Raymond M. Galasso, PC; Bobby D. Slaton; V. Lawrence Sewell

(57) ABSTRACT

A method for facilitating inverse multiplexing over asynchronous transfer mode is disclosed herein. The method includes receiving a stream of sequentially aligned ATM cells via an originating end point logical communication link. A sequence identifier is associated with each one of the ATM cells for creating sequence-identified ATM cells. The sequence-identified ATM cells are forwarded to a destination endpoint logical communication link in a distributed manner over a plurality of IM communication links. A first one of said IM communication links has disparate data transmission rates in at least one data transmission direction with respect to a second one of the IM communication links.

79 Claims, 12 Drawing Sheets

FACILITATING INVERSE MULTIPLEXING OVER ASYNCHRONOUS TRANSFER MODE VIA COMMUNICATION LINKS HAVING DISPARATE DATA TRANSMISSION RATES

CROSS REFERENCE TO RELATED APPLICATIONS

This application claims the benefit of U.S. Provisional Patent Application having Ser. No. 60/286,211 filed Apr. 24, 2001 entitled "INVERSE MULTIPLEXING ACROSS ATM LINKS WITH VARIABLE RATES" and the benefit of U.S. Non-Provisional patent application having Ser. No. 09/841,734 filed Apr. 24, 2001 entitled "FACILITATING INVERSE MULTIPLEXING OVER ASYNCHRONOUS TRANSFER MODE VIA COMMUNICATION LINKS HAVING DISPARATE DATA TRANSMISSION RATES", both of common assignee herewith.

FIELD OF THE DISCLOSURE

The disclosures made herein relate generally to inverse multiplexing over asynchronous transfer mode and more particularly to facilitating inverse multiplexing over asynchronous transfer mode via communication links having disparate data transmission rates.

BACKGROUND

Inverse Multiplexing (IM) is a data communication technique that allows a grouping of lower speed communication links into one logical higher speed communication link of approximately the same transmission bandwidth capacity as the sum of the lower speed communication links. Such a grouping of lower speed communication links for facilitating IM are referred to herein as a group of IM communication links. IM techniques are often used when cost or technical feasibility prevents deployment of a single higher speed point-to-point communication link. For all essential purposes, the group of IM communication links behaves identically to a single point-to-point higher speed communication link of the same capacity.

One example of an application for utilizing IM techniques is to increase the speed of Internet access beyond what is capable with a single xDSL (e.g. SDSL, ADSL, etc.) service. This is particularly important to subscribers living further from the central office communication apparatus providing the subscriber's service because xDSL link rates reduce with increasing distance. Another example of an application for utilizing IM techniques is to deliver basic video communications using xDSL services. The majority of xDSL subscribers are capable of receiving xDSL services in the speed range (i.e. bit rate) of at least about 1.5 Mbit/s to about 2 Mbit/s. Such a bit rate is generally not considered sufficient for the delivery of entertainment grade video and interactive video services. However, by combining two or more IM communication links into one logical link, such entertainment grade video and interactive video services may be facilitated for most xDSL subscribers.

Asynchronous Transfer Mode (ATM) is a transport protocol that is widely deployed in high-speed data networks and that allows the multiplexing of different information streams across one ATM formatted communication link. IM over ATM (IMA) related to an ATM Forum standard (i.e. AF-PHY-0086.001) which outlines a standardized technique for using IM techniques over ATM formatted communication links. In the case of ATM, a group of ATM formatted IM communication links (i.e. an IMA group) behaves as if it were a single higher speed ATM communication link. For example, in the case of IMA over a pair of IM communication links each having an upstream data transmission rate of 1.5 megabits and a downstream data transmission rate of 1.5 megabits, the aggregate data transmission rate would be 3.0 megabits in both the upstream and the downstream directions.

In order to facilitate the recombination of the traffic that is distributed across the individual links in a group of IM communication links, the IMA standard of the ATM Forum assumes that each IM communication link in an IMA group operates at exactly the same bit rate and with a constant delay. Resequencing at a receiving end of the IM communication links is then a simple matter of reordering ATM cells based on a function of the arrival time and link delay. The differential delay between any two IM communication links within a IMA group is required to remain less than about 25 ms. Some ATM transport technologies (particularly some of the modes supported by some of the xDSL technologies) may lead to differential delays exceeding this value under some circumstances, therefore preventing the establishment of an IMA group or preventing the addition of some additional IM communication links into an existing IMA group.

In order to manage the individual links within an IMA group, the ATM Forum IMA standard requires the insertion of special purpose OAM (Operations and Maintenance) cells into each of the links comprising an IMA group. Depending on the configuration, these management cells consume either $\frac{1}{32}$, $\frac{1}{64}$, $\frac{1}{128}$ or $\frac{1}{256}$ of the available capacity which is therefore unavailable for carrying subscriber traffic.

Conventional IMA (e.g. the ATM Forum IMA standard) implementations are capable of being facilitated over symmetric transmission facilities and uniform transmission facilities. A symmetric transmission facility includes a plurality of IM communication links each have the same data transmission rate in an upstream and a down stream direction. A uniform transmission facility includes a plurality of IM communication links each having the same upstream data transmission rate and each having the same downstream data transmission rate, wherein the downstream data transmission rate may be different than the upstream data transmission rate.

A key limitation of conventional IMA implementations is that such implementations are not capable of being facilitated over a plurality of communication links having disparate data transmission rates. Conventional IMA implementations require that each one of the IM communication links in an IMA group have a common upstream data transmission rate and a common downstream data transmission rate. For example, all of the downstream data transmission rates being 1.5 megabits and all of the upstream data transmission rates being 500 megabits. This requirement limits the utility of IMA because the upstream data transmission rates, downstream data transmission rates or both are often different for different communication links.

Multiple ADSL communication links often do not synchronize at the same data transmission rates. Furthermore, ADSL links are inherently rate adaptive. This means that the communication device (e.g. line card, modem, etc.) on each end of an ADSL connection commonly negotiate and attempt to establish the highest bit rate permitted by their configuration. If during the life of the link, conditions change sufficiently as to warrant an increase or decrease in link speed, the communication devices renegotiate a new link speed automatically.

When selecting two or more ADSL links for bonding into an IMA group, there is a significant probability that the optimum speed for each link will differ. Therefore, in order to implement the ATM Forum standard for Inverse Multiplexing, the faster links must be slowed down to the same rate as the slowest link in the IMA group. This is non-optimal because potential capacity (ATM throughput) is foregone in satisfying the criteria that IM communication links in an IMA group operate at the same data transmission rate.

Once such an IMA group is established, should any of the links in the IMA group experience degraded line conditions necessitating a further reduction in a respective bit rate, all of the IM communication links in the IMA group must be renegotiated to the lower bit rate in order for the IMA group to remain operational. This results in further foregone capacity and a short disruption in service for the subscriber as each of the links and then the IMA protocol resynchronize. Similarly, if conditions improve warranting an increase in capacity on all IM communication links, there is likewise a short service disruption for the same reason.

The operation of the ATM Forum IMA protocol during establishment, operation and decommissioning of an IMA group is relatively complex and requires specialized hardware and/or software to support the protocol. The complexity adds a significant cost to equipment using known implementation techniques. The added cost is enough in cost sensitive applications as to make utilization of IMA using conventional IMA implementations difficult to justify.

Therefore, facilitating IMA via IM communication links synchronized at disparate data transmission rates in a manner than overcomes limitations associated with facilitating IMA via IM communication links synchronized at a common data transmission rates is useful.

DETAILED DESCRIPTION OF THE FIGURES

With a conventional Digital Subscriber Line Access Multiplexor (DSLAM), the DSLAM enables a subscriber to establish a connection between a data processing device and a communication network via a single ADSL data communication link terminated in a conventional ADSL modem. Establishing a connection via a single ADSL data communication link, which is typically a relative low-speed communication link, limits the speed at which data can be communicated between the data processing device and the communication network. In many situations, cost or technical feasibility prevents deployment of a single high-speed point-to-point communication link for increasing the speed at which data can be communicated between the data processing device and the communication network.

In accordance with at least one embodiment of the disclosures made herein, the use of a DSLAM and an ADSL modem capable of facilitating Inverse Multiplexing over Asynchronous Transfer Mode (hereinafter referred to as IMA) enables data to be communicated between the data processing device and the communication network via two or more IM-ADSL communication links. IMA functionality operates by de-multiplexing data traffic arriving from an originating logical high-speed communication link into a plurality of lower speed transmissions, communicating the plurality of lower speed transmissions to a remote multiplexor device over a plurality of IM communication links, and re-multiplexing the low-speed transmissions into the original high speed flow at a destination logical high-speed communication link. With respect to ADSL communication links, an increase in the aggregate service bit rate is exhibited as a result of the DSLAM and ADSL modem utilizing IMA functionality to distribute data traffic across the two or more ADSL communication links. IMA functionality according to disclosures made herein is advantageous, as conventional implementations of IMA functionality are not compatible with data communication links, such as typical ADSL communication links, that have disparate and rate adaptable upstream and/or downstream data transmission rates.

Also in accordance with an embodiment of the disclosures made herein, sequence identifiers enable sequential order of ATM cells to be maintained as they are forwarded across the plurality of IM communication links. As a result, the ATM cells are presented in the correct sequence to an ATM layer of IMA-ADSL software associated with the destination endpoint IMA-ADSL communication device. It should be understood that ADSL is one example of an asymmetric data communication technique to which embodiments of the disclosures made herein relate.

Figure 1:
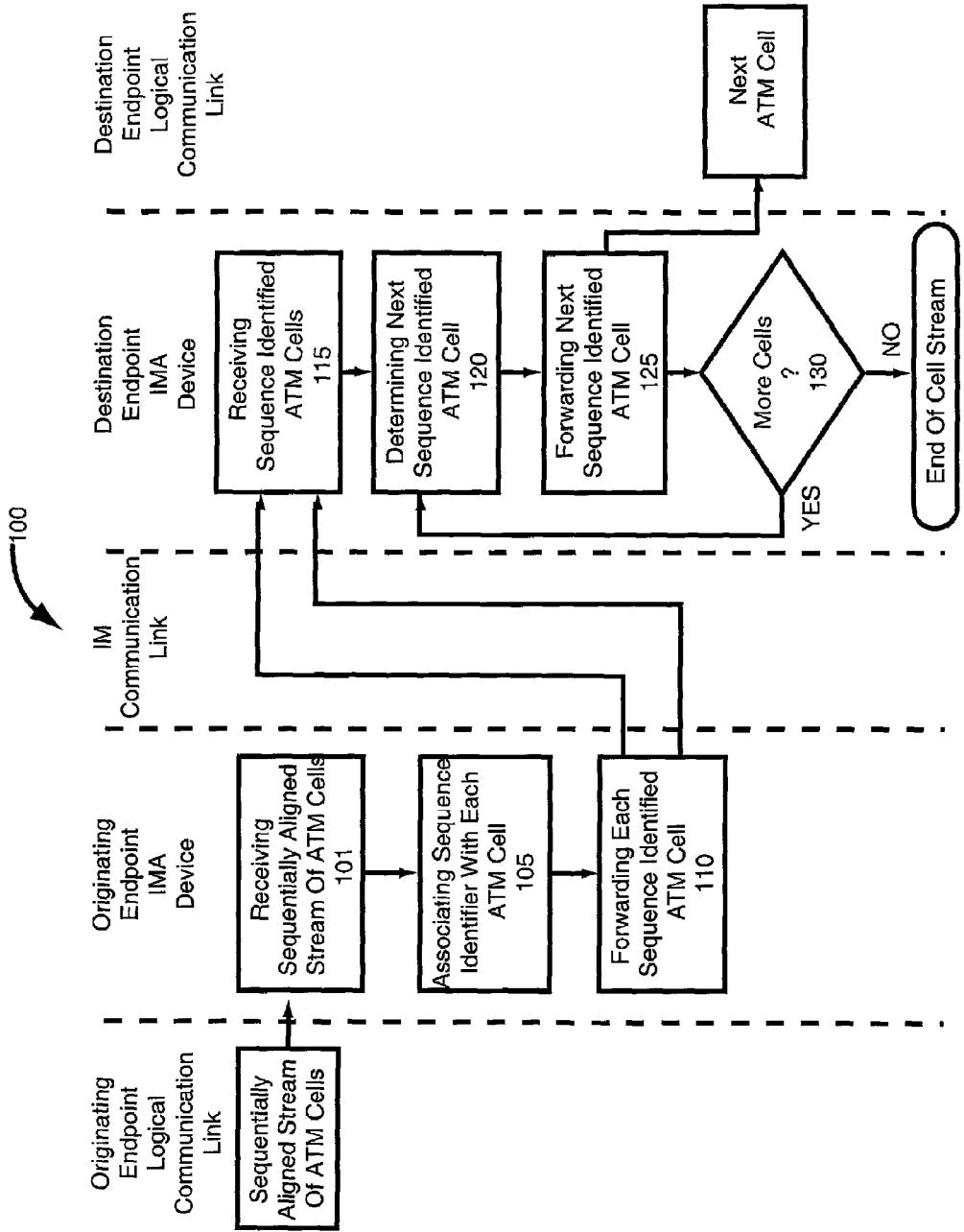
FIG. 1 is a flow chart view depicting a method for facilitating IMA functionality via a plurality of communication links having disparate data transmission rates in accordance with an embodiment of the disclosures made herein.

A method 100 for facilitating IMA functionality via communication links having disparate data transmission rates in accordance with an embodiment of the disclosures made herein is depicted in FIG. 1. An operation 101 for receiving sequentially aligned ATM cells from an originating endpoint logical communication link is performed. In at least one embodiment of the operation 101, the operation 101 is facilitated by an originating endpoint IMA-ADSL communication device and includes holding at least a portion of the sequentially aligned ATM cells in a data storage device, such as a queue (e.g. a buffer) of the originating endpoint IMA-ADSL communication device. In the upstream direction as defined herein, an IMA-ADSL modem is an example of the originating endpoint IMA-ADSL communication device. In the downstream direction as defined herein, an IMA-ADSL line card of a DSLAM is an example of the originating endpoint IMA-ADSL communication device.

In response to receiving the sequentially aligned ATM cells, an operation 105 for associating a sequence identifier with each ATM cell is performed. One embodiment of the operation 105 includes determining a sequence code (e.g. a sequence number) for each one of the ATM cells and inserting the sequence code into an information payload portion of the corresponding one of the ATM cells. Another embodiment of the operation 105 includes determining a sequence code for each one of the ATM cells and inserting the sequence code in a header portion of the corresponding one of the ATM cells. In at least one embodiment of the operation 105, the originating endpoint IMA-ADSL communication device facilitates the operation 105. The information payload portion and the header portion are examples of cell information blocks of an ATM cell. After the sequence identifier is associated with the corresponding ATM cell, such an ATM cell is defined herein to be a sequence-identified ATM cell. A sequence identified ATM cell advantageously facilitates implementation of IMA in accordance with embodiments of the disclosures made herein.

An operation 110 for forwarding each sequence-identified ATM cell over one of a plurality of IM communication links to a destination endpoint IMA-ADSL communication device is performed. In one embodiment of the operation 110, the originating endpoint IMA-ADSL communication device facilitates the operation 110. In the upstream direction as defined herein, an IMA-ADSL line card of a DSLAM is an example of the destination endpoint IMA-ADSL communication device. In the downstream direction as defined herein, an IMA-ADSL modem is an example of the destination endpoint IMA-ADSL communication device.

In response to performing the operation 110, an operation 115 for receiving each sequence-identified ATM cell is performed. In one embodiment of the operation 115, the operation 115 is facilitated by the destination endpoint IMA-ADSL communication device and includes holding at least a portion of the sequence-identified ATM cells in a data storage device, such as a buffer of the destination endpoint IMA-ADSL communication device.

After receiving at least a portion of the sequence-identified ATM cells, an operation 120 is performed for determining a next sequence-identified ATM cell to forward over a destination endpoint logical communication link. The operation 120 includes determining the sequence identifier for a plurality of sequence-identified ATM cells. In one embodiment of the operation 120, the operation 120 is facilitated by the destination endpoint IMA-ADSL communication device and includes determining the next sequence-identified ATM cell from a plurality of sequence-identified ATM cells residing in a data storage device, such as a buffer of the destination endpoint IMA-ADSL communication device.

After performing the operation 120, an operation 125 is performed for forwarding the next sequence-identified ATM cell over the destination endpoint logical communication link. Also after performing the operation 120, an operation 130 is performed for determining whether any remaining sequence-identified ATM cells associated with the ATM cell stream exist, such as in the buffer of the destination endpoint IMA-ADSL communication device. If one or more remaining sequence-identified ATM cells exist, the operations 120–130 are repeated until there are no remaining sequence-identified ATM cells to be forwarded over the destination endpoint logical communication link. In one example of the operation 130, the operation 130 is performed in response to performing the operation 120. In another embodiment of the operation 130, the operation 130 is performed in response to performing the operation 125.

The operations 120–130 are jointly defined as an operation for forwarding an aligned stream of inversely multiplexed ATM cells. In at least one embodiment of the operation for forwarding an aligned stream of inversely multiplexed ATM cells, such an operation includes sequentially retrieving the sequence-identified ATM cells from a data storage device such as a buffer.

Figure 2:
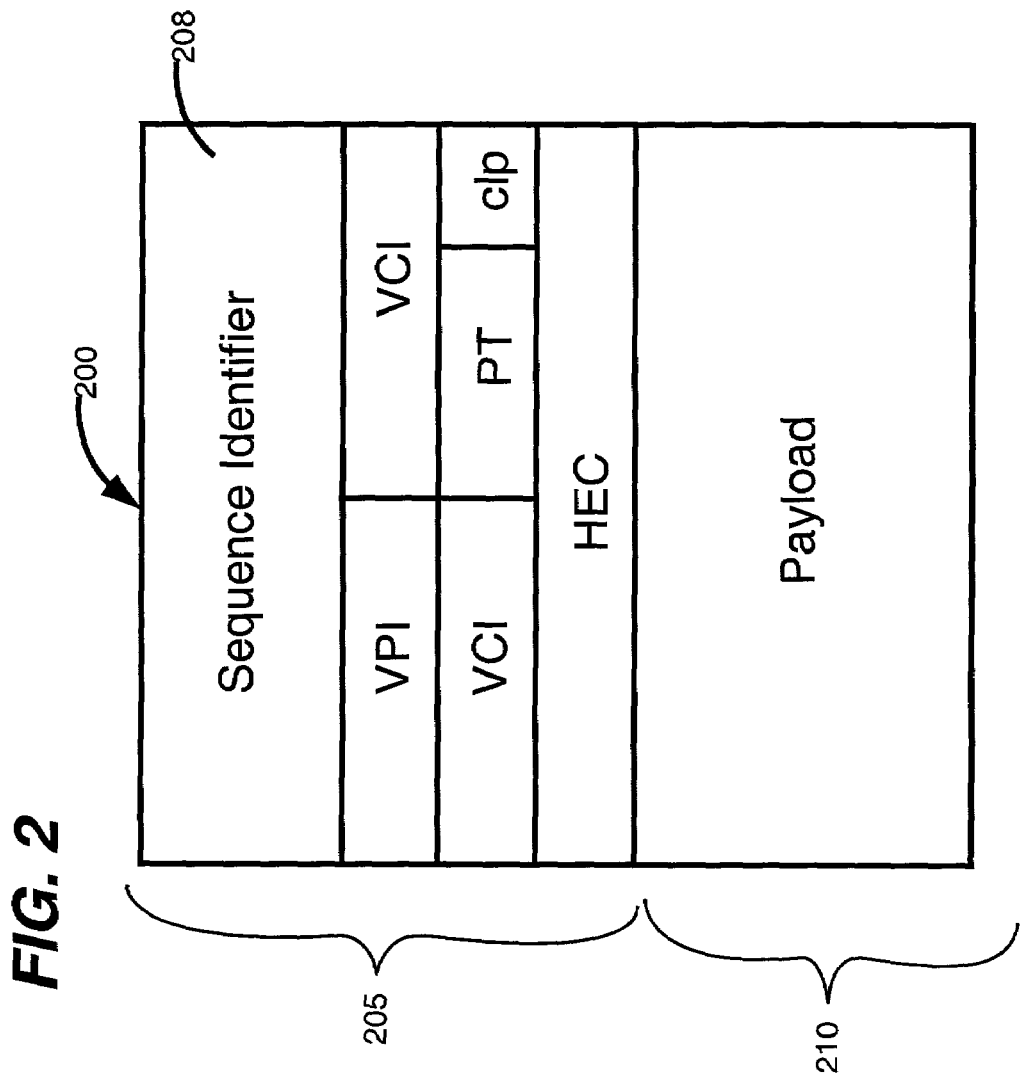
FIG. 2 is a diagrammatic view depicting a sequence-identified ATM cell in accordance with an embodiment of the disclosures made herein.
Figure 3:
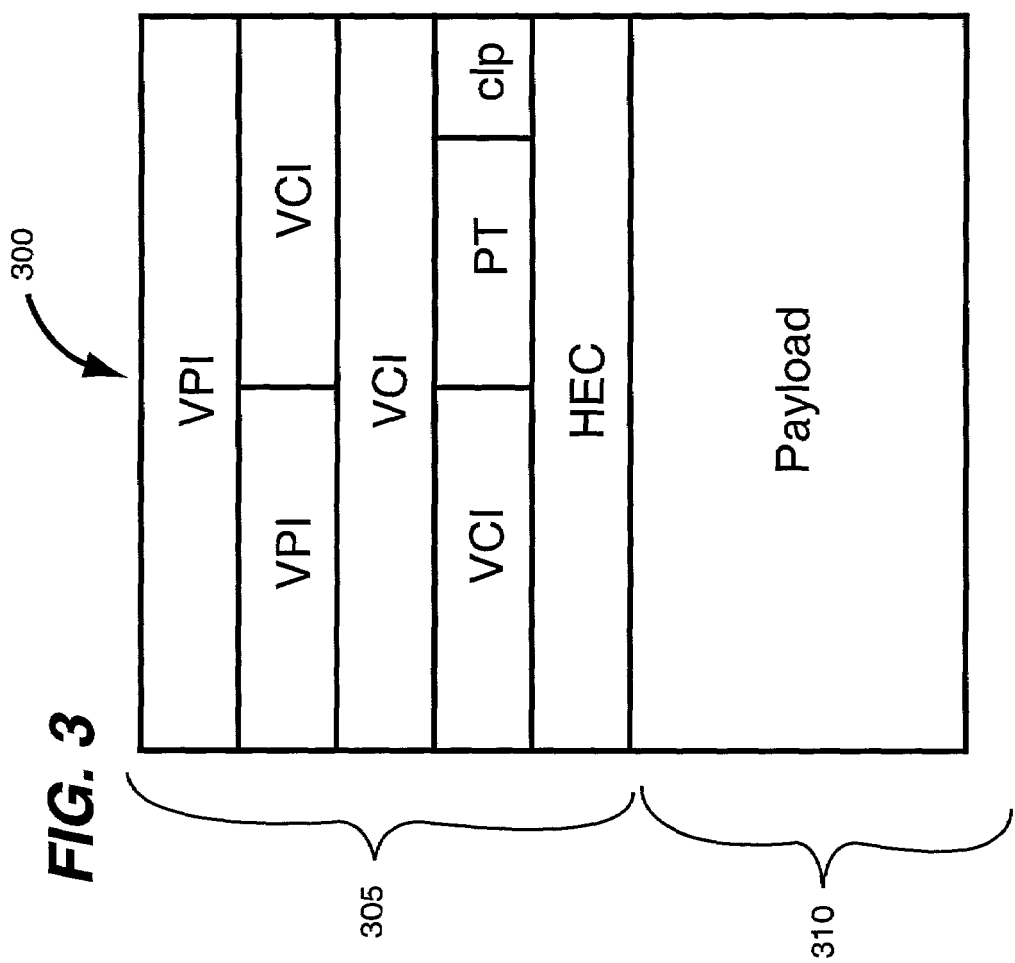
FIG. 3 is a diagrammatic view depicting a conventional ATM cell.

A sequence-identified ATM cell 200 in accordance with an embodiment of the disclosures made herein is depicted in FIG. 2. The sequence-identified ATM cell 200 has a modified header portion 205 with respect to a header portion 305 of a conventional ATM cell 300 (FIG. 3). The header portion 205 of the sequence-identified ATM cell 200 includes a sequence identifier 208 for identifying placement of the sequence-identified ATM cell 200 in a steam of sequence-identified ATM cells. For example, the first 16 bits of the sequence-identified ATM cell 200 are assigned the role of conveying the sequence identifier 208. At least a portion of the remaining addressing bits are divided into 4-bit Virtual Path Identifiers (VPI's) and 8 bit Virtual Channel Identifiers (VCI's). The sequence-identified ATM cell 200 and the conventional ATM cell 300 each include respective information payload portions (210, 310).

The particular assignment of VPI and VCI in the modified cell is not limiting to embodiments of the disclosures made herein. Accordingly, it is contemplated that data cells according to embodiments of the disclosures made herein may have a variety of known and newly discovered header assignments.

The ATM standard supports a very large number of potential connection identifiers on any one of the IM communication links. There may be up to 256 or 4096 "Virtual Paths" (VPs) and more than 65500 "Virtual Channel" (VCs) connections within each of the numerous VPs on a single IM communication link. Typically, xDSL services and equipment provide for between one and 16 connections on an xDSL line.

Because of the large disparity between the number of available connection identifiers and the actual number that are typically required and used, many of the addressing bits in the header portion of an ATM cell are always set to the same value in each ATM cell that crosses the IM communication links. Accordingly, they are not used to carry useful information. In accordance with the disclosures made herein, at least a portion of these "unused" header bits are used to convey a sequence identifier for facilitating Inverse Multiplexing and/or link bonding protocol. Accordingly, at least a portion of the "unused" bits is redefined to assist in a cell re-sequencing process, as discussed herein in greater detail below. Unused address space may be used similarly to convey the sequence identifier.

It should be understood that an ATM cell in accordance with embodiments of the disclosures made herein may be configured such that a portion of its header bits assigned to carry the VPI, VCI, PTI, CLP and/or HEC information. A remaining portion of the header bits is used for conveying a sequence identifier (e.g. a sequence number). The bits assigned for conventional ATM header information need not be the same bits that carry such conventional ATM header information under the standard ATM cell header definitions. However, for convenience and compatibility with existing transmission devices, it is beneficial for the bits assigned for conventional ATM header information to be the same bits that carry such conventional ATM header information under the standard ATM cell header definitions.

Certain combinations of ATM cell header bits may convey a pre-defined meaning under the ATM standard. An "unassigned" cell and an "idle" cell are examples of ATM cells having such a pre-defined meaning. Accordingly, in order to be compatible with and correctly transported through equipment which complies with the ATM standard, methods and systems that generate sequence numbers and assigns them to incoming ATM cells in accordance with embodiments of the disclosures made herein should avoid generating sequence identified ATM cells that a compliant ATM apparatus (e.g. ADSL transmission devices) will interpret to be standard ATM cells holding special meaning. Similarly, the receiving function which identifies the incoming sequence numbers and orders the cells into the appropriate receive buffer should accommodate the fact that the transmitting end will skip over sequence numbers which would have generated a cell header with a special meaning. An alternate solution is that the transmission devices are adapted to honor the new sequence number system without concern for ATM cell header bits that may convey a convey a pre-defined meaning. However, such a solution may be inconvenient or prohibitive in some potential implementations.

In at least one embodiment of the sequence identifier, the maximum size of the sequence identifier (e.g. a sequence number) should be chosen so that it is at least twice the number of receiver queues locations (e.g. buffers). The number of receiver queue locations is at least partially a function of the differential speed and delay of the IM communication links in the respective bonded group.

Figure 4:
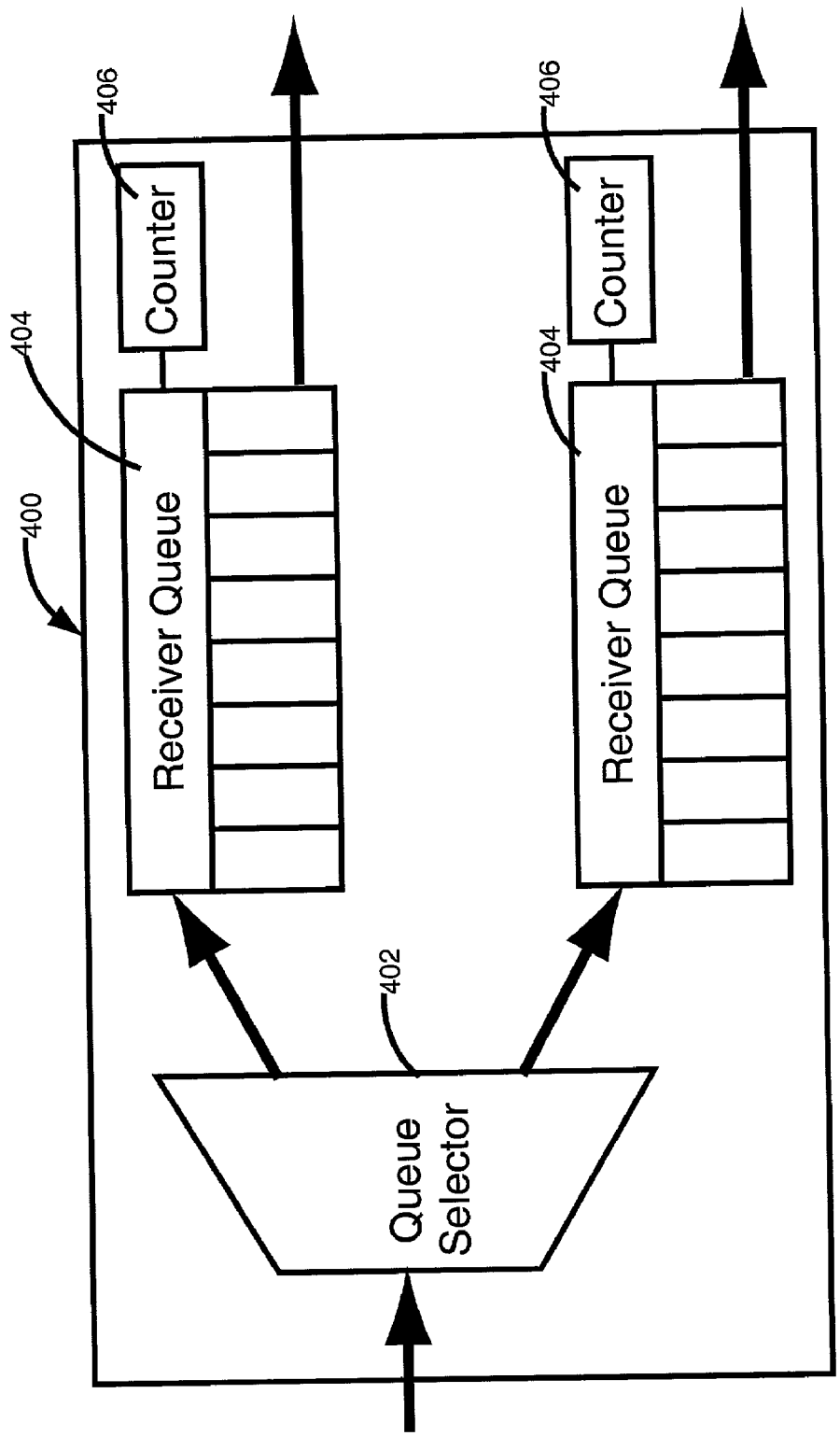
FIG. 4 is a block diagram view depicting a transmitter capable of facilitating transmission functionality for transmitting cells across a plurality of IM communication links in accordance with an embodiment of the disclosures made herein.

FIG. 4 depicts an embodiment of a transmitter 400 in accordance with an embodiment of the disclosures made herein. The transmitter 400 is capable of facilitating transmit functionality for transmitting cells across a plurality of IM communication links. In at least one embodiment of the originating endpoint IMA device depicted in FIG. 1, the originating endpoint IMA device comprises the transmitter 400.

The transmitter 400 includes a queue selector 402, a plurality of receiver queues 404 (e.g. buffers), and a counter 406 associated with each one of the receiver queues 404. The selector queue 402 is capable of selectively routing ATM cells to each one of the plurality of receiver queues 404. ATM cells are one example of packetized information. For example, the queue selector 402 may direct ATM cells to a receiver queue with the most number of empty cell locations or to the receiver queue sequentially following the receiver queue that received the last ATM cell. In practice, there may be two or more receiver queues 404. Each counter 406 is capable of determining the number of occupied locations and/or empty location in a respective one of the queues 404.

It is desirable for the receiver queues 404 to be set to different lengths when the IM communication links are operating at different data transmission rates. For the receiver functionality disclosed herein, it is advantageous to provide a shorter queue length for communication links operating at slower data transmission rates and longer queue lengths for communication links operating at higher data transmission rates. To this end, for example, the receiver queue lengths are chosen such that the time required to transmit cells from all of the receiver queue locations from the transmitter across the communication links to the receiver is equal when all of the receiver queues are initially completely full. In accordance with at least one embodiment of the disclosures made herein, reference data transmission rates (e.g. average data transmission rates) are used to determine such time required to transmit the cells.

Figure 5:
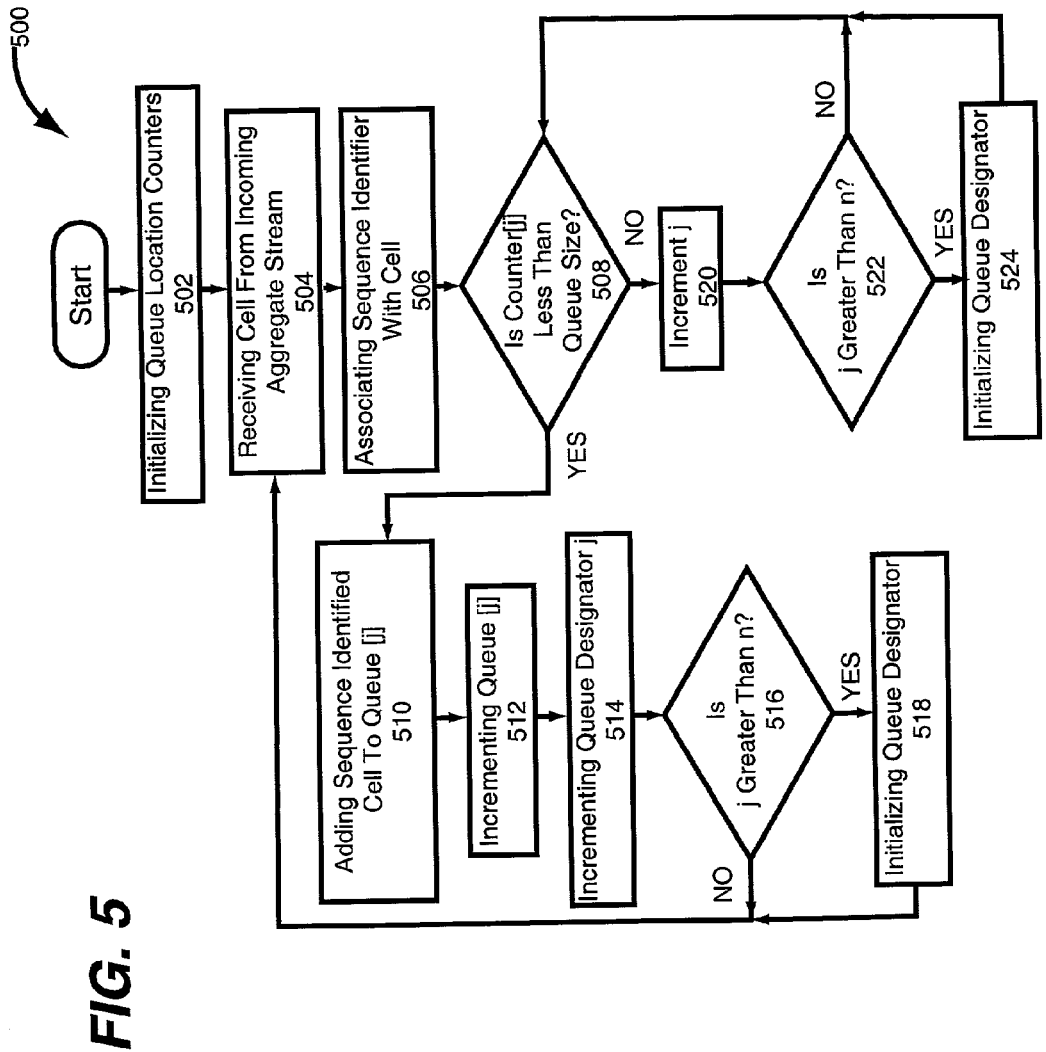
FIG. 5 is a flow chart view depicting a method for facilitating transmission functionality via the transmitter depicted in FIG. 4.

FIG. 5 depicts a method 500 for facilitating transmission functionality via the transmitter 400 (depicted in FIG. 4), for enabling cells (e.g. ATM cells) to be transmitted across a plurality of IM communication links in accordance with an embodiment of the disclosures made herein. The method 500 includes an operation 502 for initializing a plurality of queue location counters. In one embodiment, initializing a queue location counter includes setting the queue location counter to zero and clearing all of the queue locations. After performing the operation 502 for initializing the plurality of queue location counters, an operation 504 is performed for receiving a cell from an incoming aggregate stream and then an operation 506 is performed for associating a sequence identifier with the cell.

In response to associating a sequence identifier with a cell, the cell becomes a sequence-identified cell. After performing the operation 506 for associating the sequence identifier with the cell, an operation 508 is performed for determining if a counter (e.g. counter[1]) associated with an initial queue (e.g. queue[1]) is less than a size of the initial queue. The initial queue is one of a plurality of queues (e.g. queue[j]) wherein j is between 1 and n and wherein j is a queue designator for identifying a particular one of the queues and the associated counter.

In response to the counter associated with the initial queue being less than the associated queue size (i.e. the number of occupied queue locations being less than the maximum number of queue locations), an operation 510 is performed for adding the sequence-identified cell to the initial queue. After performing the operation 510 for adding the sequence-identified cell to the initial queue, an operation 512 is performed for incrementing the initial queue to the next queue location (e.g. from a present buffer cell to a next buffer cell) and an operation 514 is performed for incrementing the queue designator j (i.e. from 1 to 2). Thus, the queue designator j points to a next one of the plurality of queues.

After performing the operation 514 for incrementing the queue designator j, an operation 516 is performed for determining if the queue designator j is greater than the maximum number of queues (i.e. n being the maximum number of queues). In response to the queue designator j not being greater than the maximum number of queues, the method 500 continues at the operation 504 for receiving a cell (i.e. the next cell) from the incoming aggregate stream. In response to the queue designator j being greater than the maximum number of queues, an operation 518 is performed for initializing the queue designator j (e.g. setting the queue designator j to 1). After performing the operation 518 for initializing the queue designator j, the method 500 continues at the operation 504 for receiving a cell (i.e. the next cell)

from the incoming aggregate stream. In this manner, the operations 512–518 facilitate adding cells to each of the plurality of queues.

Returning to the operation 508, in response to the counter associated with the next queue being less than the associated queue size, an operation 520 is performed for incrementing the queue designator j and an operation 522 is performed for determining if the queue designator j is greater than the maximum number of queues. In response to the queue designator j not being greater than the maximum number of queues, the method 500 continues at the operation 508 for determining if the counter associated with the next queue is less than a size of the next queue. In response to the queue designator j being greater than the maximum number of queues, an operation 524 is performed for initializing the queue designator j (e.g. setting the queue designator j to 1). After performing the operation 524 for initializing the queue designator j, the method 500 continues at the operation 508 for determined if the counter associated with an initial queue is less than the size of the initial queue. In this manner, the operations 508, 520, 522 and 524 facilitate a loop for identifying and/or waiting for an empty queue location of a particular one of the plurality of queues.

Figure 6:
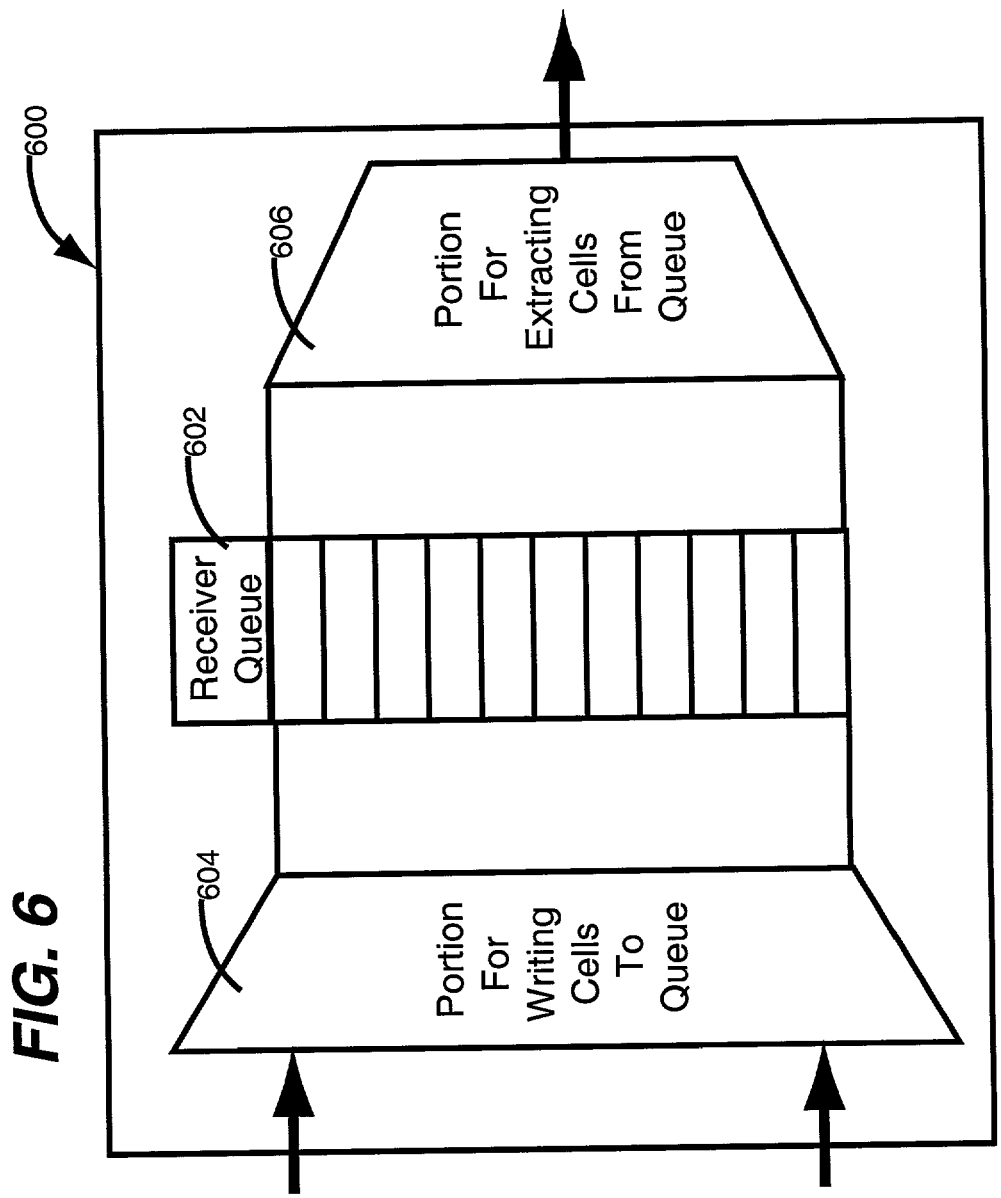
FIG. 6 is a block diagram view depicting a receiver capable of facilitating reception functionality for receiving cells from across a plurality of IM communication links in accordance with an embodiment of the disclosures made herein.

FIG. 6 depicts a receiver 600 in accordance with an embodiment of the disclosures made herein. The receiver 600 is capable of facilitating reception functionality for receiving cells from across the plurality of IM communication links as transmitted by the transmitter 400, FIG. 4. The receiver 600 includes a receiver queue 602 (e.g. a buffer), a first logic portion 604 for writing cells to the receiver queue 602 and a second logic portion 606 for extracting cells from the receiver queue 602. Accordingly, the receiver 600 terminates the plurality of IM communication links within a bonded group and is capable of recombining (multiplexing) the streams of cells arriving on each one of the IM communication links in the same sequence as they were originally delivered to the transmitter 400. In at least one embodiment of the destination endpoint IMA device depicted in FIG. 1, the destination endpoint IMA device comprises the receiver 600.

Figure 7:
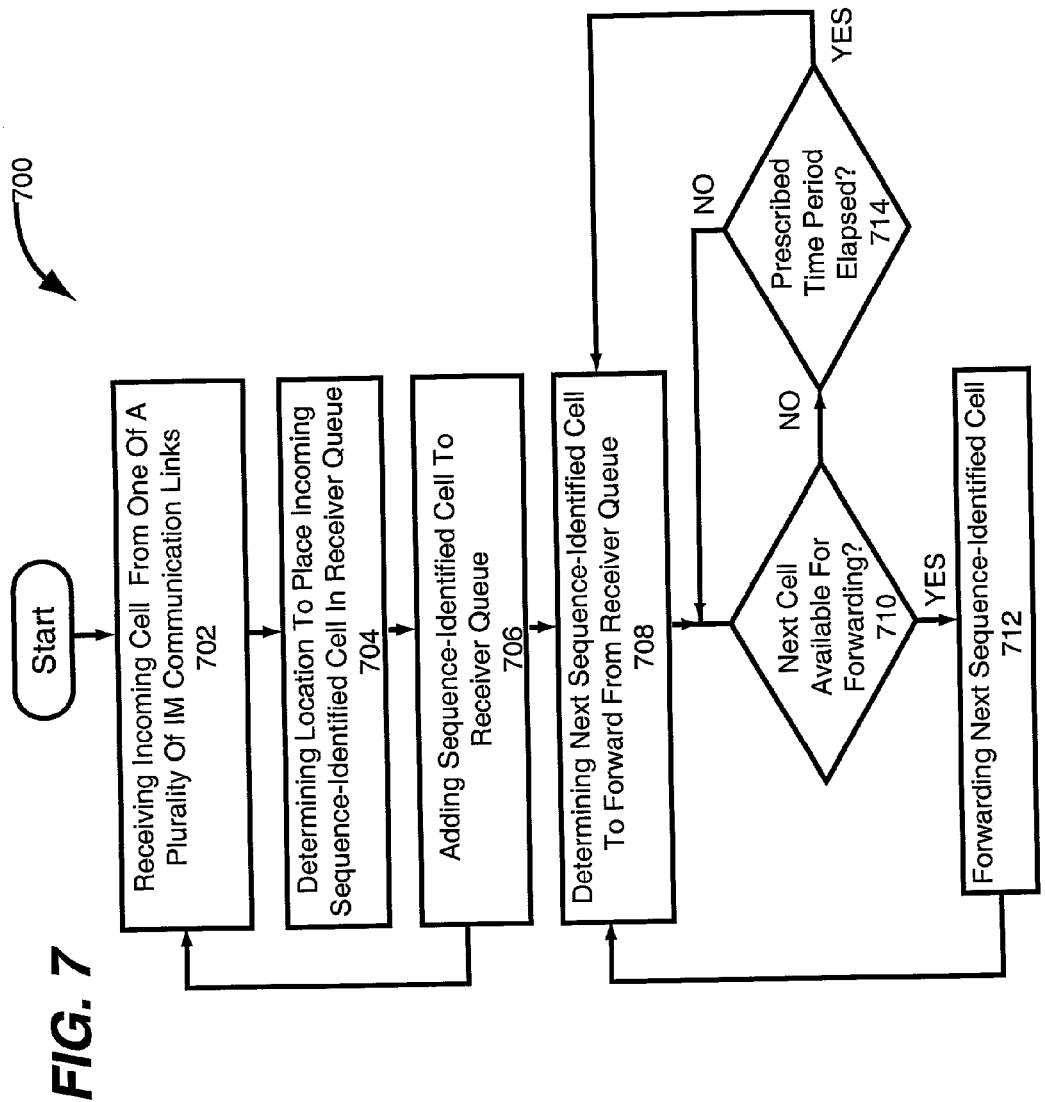
FIG. 7 is a flow chart view depicting a method for facilitating reception functionality via the receiver depicted in FIG. 6.

FIG. 7 depicts a method 700 for facilitating reception functionality via the receiver 600, FIG. 6, for enabling cells to be received from the plurality of IM communication links in accordance with an embodiment of the disclosures made herein. The method 700 includes an operation 702 for receiving an incoming sequence-identified cell from one of a plurality of IM communication links. In response to performing the operation 702 for receiving the incoming sequence-identified cell, an operation 704 is performed for determining a queue location in which to place the sequence-identified cell within the receiver queue. After performing the operation 704 for determining the queue location in which to place the sequence-identified cell, an operation 706 is performed for adding the sequence-identified cell to the receiver queue at the determined queue location. The operations 702–706 are continually repeated for adding subsequent sequence-identified cells to the receiver queue.

An operation 708 is performed for determining the next sequence-identified cell to forward from the receiver queue. The operation 708 for determining the next sequence-identified cell to forward may be performed in response to, after and/or in parallel with performing the operation 706 for adding the sequence-identified cell to the receiver queue. An operation 710 is performed for determining if the next sequence-identified cell is available for forwarding. By being available for forwarding, it is meant that such cell has been added to the receiver queue. In response to the next sequence-identified cell being available for forwarding, an operation 712 is performed for forwarding the next sequence-identified cell. The method 700 then continues at the operation 708 where the next cell to be forwarded to the receiver queue is determined.

Returning to the operation 710, in response to the next sequence-identified cell (i.e. the current next sequence identified cell) not being available for forwarding, an operation 714 is performed for determining if a prescribed time period has elapsed. The prescribed time period is a time-out, after which the next sequence-identified cell is assumed to be lost or to have an error associated therewith. In response to the prescribed time period being elapsed, the method 700 continues at the operation 708 for determining a new next sequence-identified cell to be forwarded from the receiver queue. In response to the prescribed time period not being elapsed, the method 700 continues at the operation 710 for determining if the current next sequence-identified cell has been added to the receiver queue, thus being available for forwarding. The operation 710 and the operation 714 facilitate forwarding of cells that arrive at the receiver in a delayed manner with respect to other cells.

Figure 8:
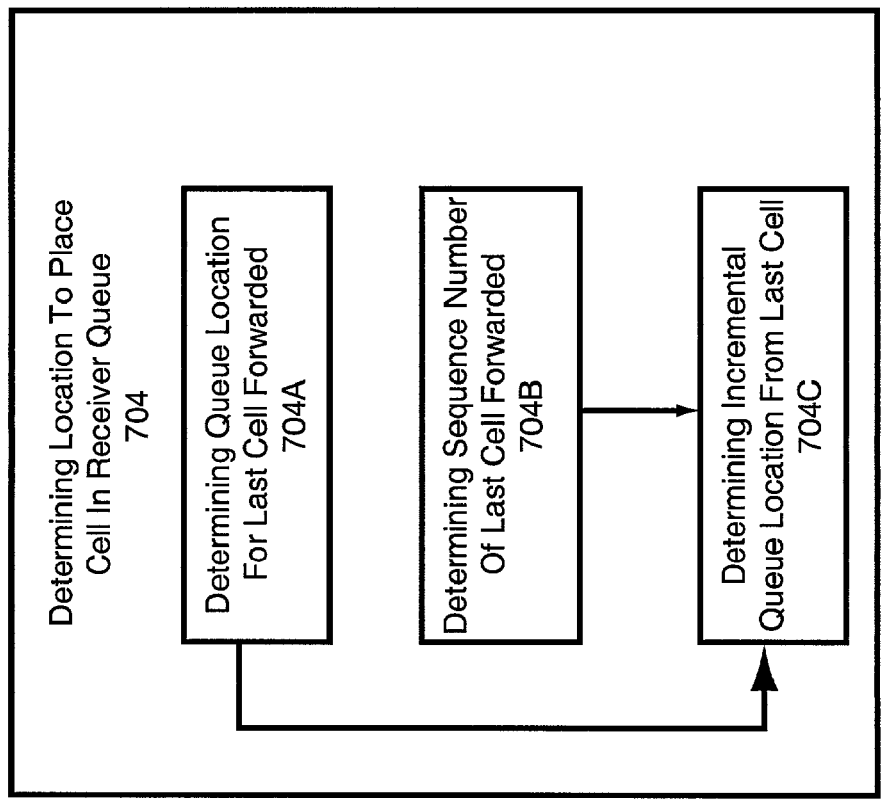
FIG. 8 is a flow chart view depicting a method for determining a queue location in which to place a sequence-identified cell in within a receiver queue.

As depicted in FIG. 8, in at least one embodiment of the operation 704, the operation 704 includes a step 704A for determining a receiver queue location for the incoming cell and a step 704B for determining the sequence identifier associated with the last cell forwarded. In response to performing the step 704A and the step 704B, a step 704C is performed for determining an incremental queue location with respect to the queue location associated with the last cell. For example, if the sequence number of the incoming cell is 3 greater than the last cell forwarded, the incoming cell would be added to the receiver queue at a receiver queue location 3 positions after the receiver queue position of the last cell forwarded. In this manner, the cells are maintained in the receiver queue in sequential order. When a maximum location of the receiver queue is achieved, the method wraps to an initial location of the receiver queue.

Figure 9:
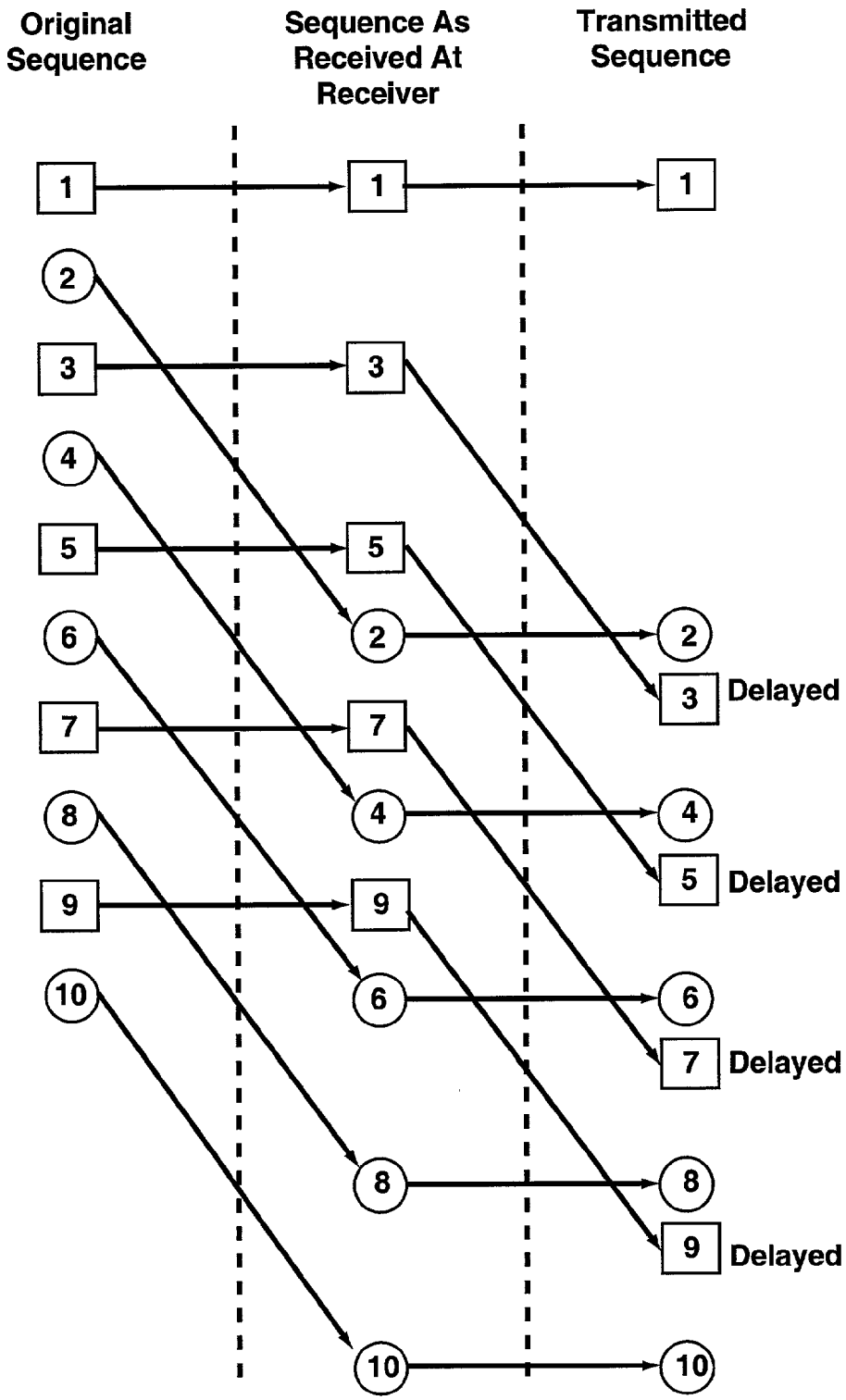
FIG. 9 is a diagrammatic view depicting an example of a cell forwarding sequence in which forwarding of a portion of a plurality of cells is delayed due to facility differences.

FIG. 9 depicts an example of a cell forwarding sequence in which forwarding of a portion of a plurality of cells (10 cells shown) is delayed due to facility operating parameter differences. Capacity (e.g. transmission rate) and delay are examples of facility operating parameters. As depicted, cell 2, cell 4, cell 6, cell 8 and cell 10 (i.e. first facility cells) arrive at a receiver in a delayed manner relative to cell 3, cell 5, cell 7 and cell 9 (i.e. second facility cells). Accordingly, the forwarding of cell 3, cell 5, cell 7 and cell 9 is delayed until the preceding cell(s) arrive and are forwarded. The delay of the first facility cells is a result of the first facility having a lower capacity (i.e. transmission rate) than the second facility, a longer delay than the second facility or both.

Figure 10:
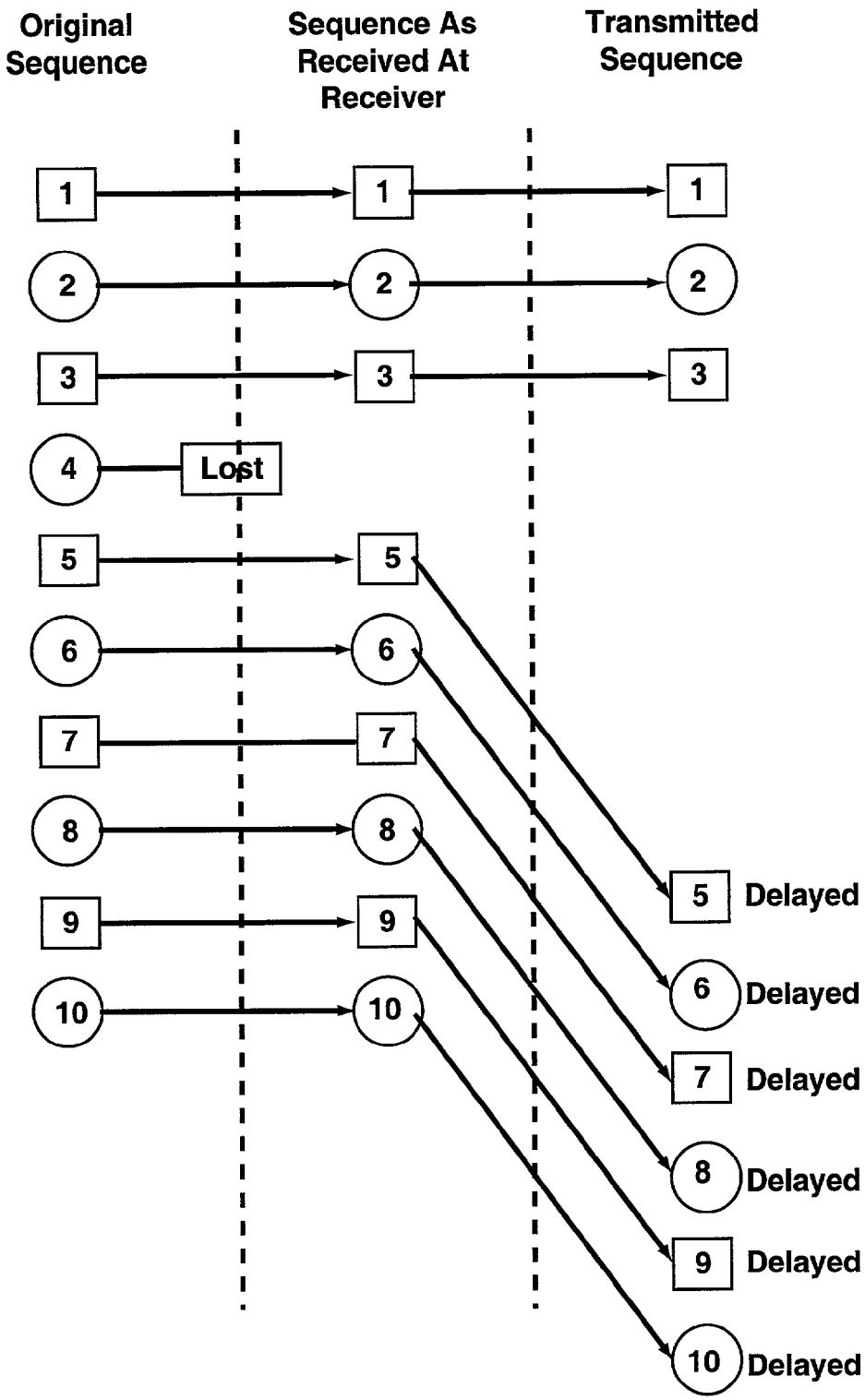
FIG. 10 is a diagrammatic view depicting an example of a cell forwarding sequence in which forwarding of a portion of a plurality of cells is delayed due to one or more cells being lost.

FIG. 10 depicts an example of a cell forwarding sequence in which forwarding of a portion of a plurality of cells (10 cells shown) is delayed due to one or more cells being lost. A cell may be lost due to an associated error. Cell 2, cell 4, cell 6, cell 8 and cell 10 are associated with a first facility (i.e. first facility cells) and cell 1, cell 3, cell 5, cell 7 and cell 9 are associated with a second facility (i.e. second facility cells). In the example depicted, the first facility and the second facility exhibit a common capacity and a common delay.

As depicted in FIG. 10, cell 4 is lost. Cell 1, cell 2 and cell 3 are transmitted without any associated delays. However, the loss of cell 4 causes a delay in transmission of the remaining cells relative to the time at which they were received at the receiver. The delay is associated with a prescribed time period that supports waiting for a cell to arrive at the receiver, as discussed in reference to FIG. 7. Once the prescribed time period elapses, cell 5 through cell 10 is transmitted.

Figure 11:
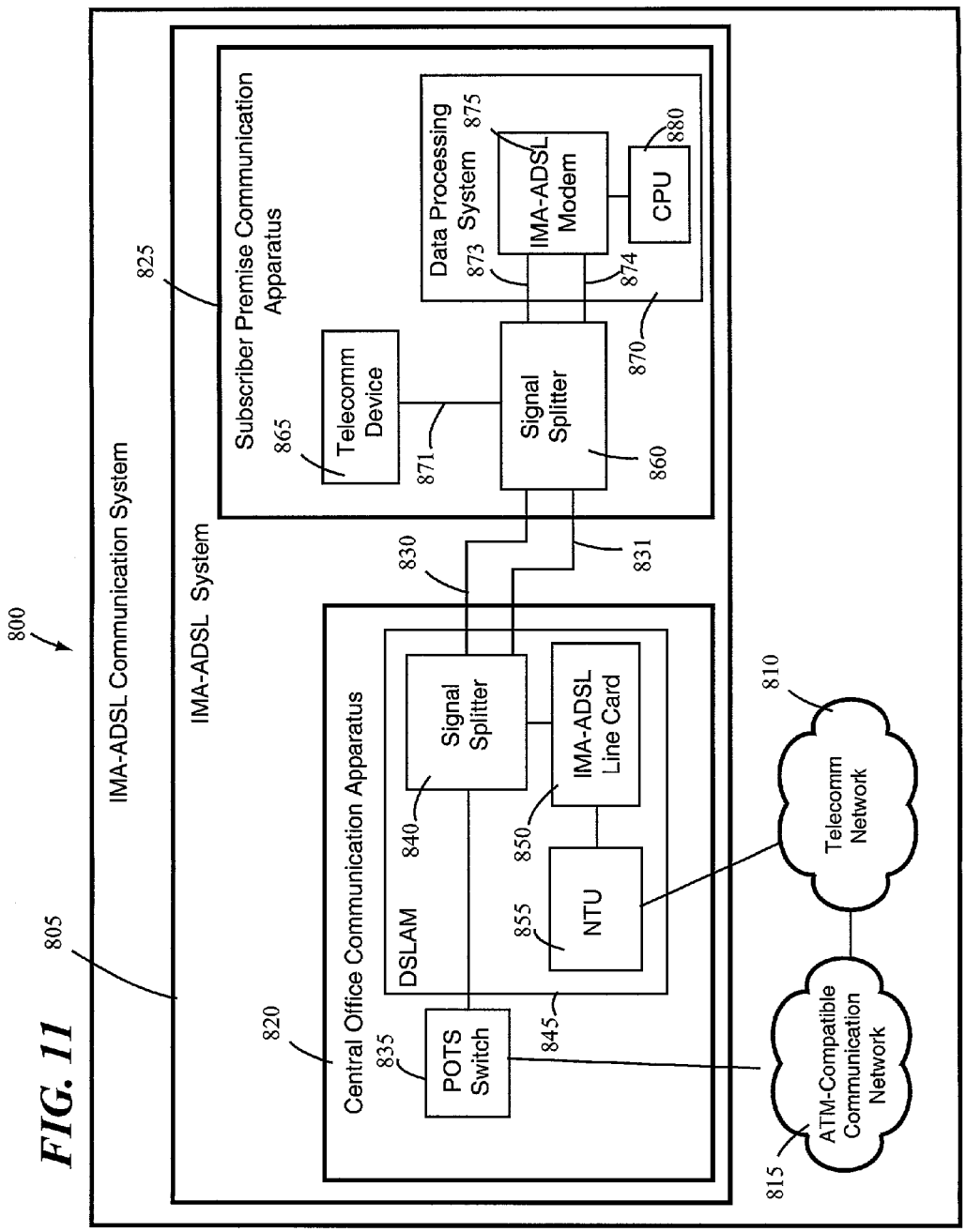
FIG. 11 is a block diagram view depicting an embodiment of an IMA-ADSL communication system in accordance with an embodiment of the disclosures made herein.

A communication system 800 in accordance with an embodiment of the disclosures made herein is depicted in FIG. 11. The communication system 800 includes an IMA-compatible Asymmetric Digital Subscriber Line (ADSL) system 805 having a telecommunication network 810 and an Asynchronous Transfer Mode (ATM) compatible communication network 815 connected thereto. The telecommunication network 810 is connected directly to the ATM-compatible communication network 815 for enabling direct communication therebetween. A Public Switched Telephone Network (PSTN) is an example of the telecommunication network 810. A suitably configured computer network system, such as a suitably configured portion of the Internet, is an example of the ATM-compatible data network 815. In other embodiments (not shown) of the communication system 800, the telecommunication network 810 is not connected directly to the ATM-compatible data network 815.

The ADSL system 805 includes a central office communication apparatus 820 and a subscriber premise communication apparatus 825 connected to the central office apparatus 820 for providing an ADSL service therebetween. The central office communication apparatus 820 facilitates Plain Old Telephone Service (POTS) and ADSL service for the subscriber premise communication apparatus 825 via the telephone network system 810 and the ATM-compatible data network 815, respectively. The central office communication apparatus 820 is connected to the subscriber premise communication apparatus 825 via a first paired-conductor transmission line 830 and a second paired-conductor transmission line 831. A twisted pair telephone line that is typically used for carrying telephony signals is an example of the first and the second paired-conductor transmission lines 830, 831. ADSL data is carried over the first and the second paired-conductor transmission lines 830, 831. A POTS telephone signal may be carried over one or both of the paired-conductor transmission lines 830, 831.

The central office communication apparatus 820 includes a POTS switch 835 connected to a Subscriber Line Access Multiplexor (DSLAM) 845. The DSLAM 845 includes a signal splitter 840, an IMA-ADSL line card 850 and a Network Termination Unit (NTU) 855. The POTS switch 835 and the IMA-ADSL line card 850 are connected to the signal splitter 840. The DSLAM 845 is connected to the ATM-compatible data network via the NTU 855. An active signal splitter and a passive signal splitter are examples of the signal splitter 840.

The subscriber premise communication apparatus 825 includes a signal splitter 860, a telecommunication device 865 and a data processing system 870. The data processing system includes an IMA-ADSL modem 875 and a central processing unit (CPU) 880. The telecommunication device 865 and the IMA-ADSL modem 870 are both connected to the signal splitter 860 of the subscriber premise communication apparatus 825. The CPU 880 is connected to the IMA-ADSL modem 870. A telephone and a personal computer are examples of the telecommunication device 865 and the CPU 880, respectively.

The signal splitter 840 of the DSLAM 845 is connected to the signal splitter 860 of the subscriber premise communication apparatus 825 via the first and the second paired-conductor transmission lines 830, 831. The signal splitters 840, 860 allow ADSL data signals to co-exist on the paired-conductor transmission lines 830, 831 with telephony signals. In this manner, simultaneous access to ADSL service and POTS service is provided.

The signal splitters 840, 860 are bi-directional devices. In a traffic direction away from the paired-conductor transmission lines (830, 831), each one of the signal splitters 840, 860 splits a corresponding aggregate signal into a POTS signal and an ADSL signal. In a traffic direction toward the paired-conductor transmission lines (830, 831), each one of the signal splitters 840, 860 combines a POTS signal and an ADSL signal into a corresponding aggregate signal.

With respect to conventional functionality provided by the DSLAM, the DSLAM 845 is capable of multiplexing a plurality of ADSL data signals onto a high-speed data communication link, such as an ATM data communication link 856. In an upstream direction (toward the data network 815), the DSLAM 845 combines, or multiplexes, ADSL data traffic from different subscribers onto the ATM data communication link 856. The ATM data communication link 856 is connected between the NTU 855 and the ATM-compatible data network 815. In a downstream direction (toward the subscriber premise communication apparatus 825), the DSLAM 845 divides high-speed data traffic from the data network 815 into a plurality of ADSL communication links corresponding to particular paired conductor transmission line, such as the first and the second paired-conductor transmission lines 830, 831. In a conventional manner, the DSLAM 845 may divide high-speed data traffic among a plurality of different subscriber premise communication apparatuses.

The IMA-ADSL line card 850 and the IMA-ADSL modem 875 are capable of providing transmitter functionality as discussed above in reference to FIGS. 4 and 5 and/or receiver functionality as discussed above in reference to FIGS. 6 through 8. Furthermore, the IMA-ADSL line card 850 and the IMA-ADSL modem 875 are examples of the originating endpoint IMA device and/or the destination endpoint IMA device discussed above in reference to FIG. 1.

Figure 12:
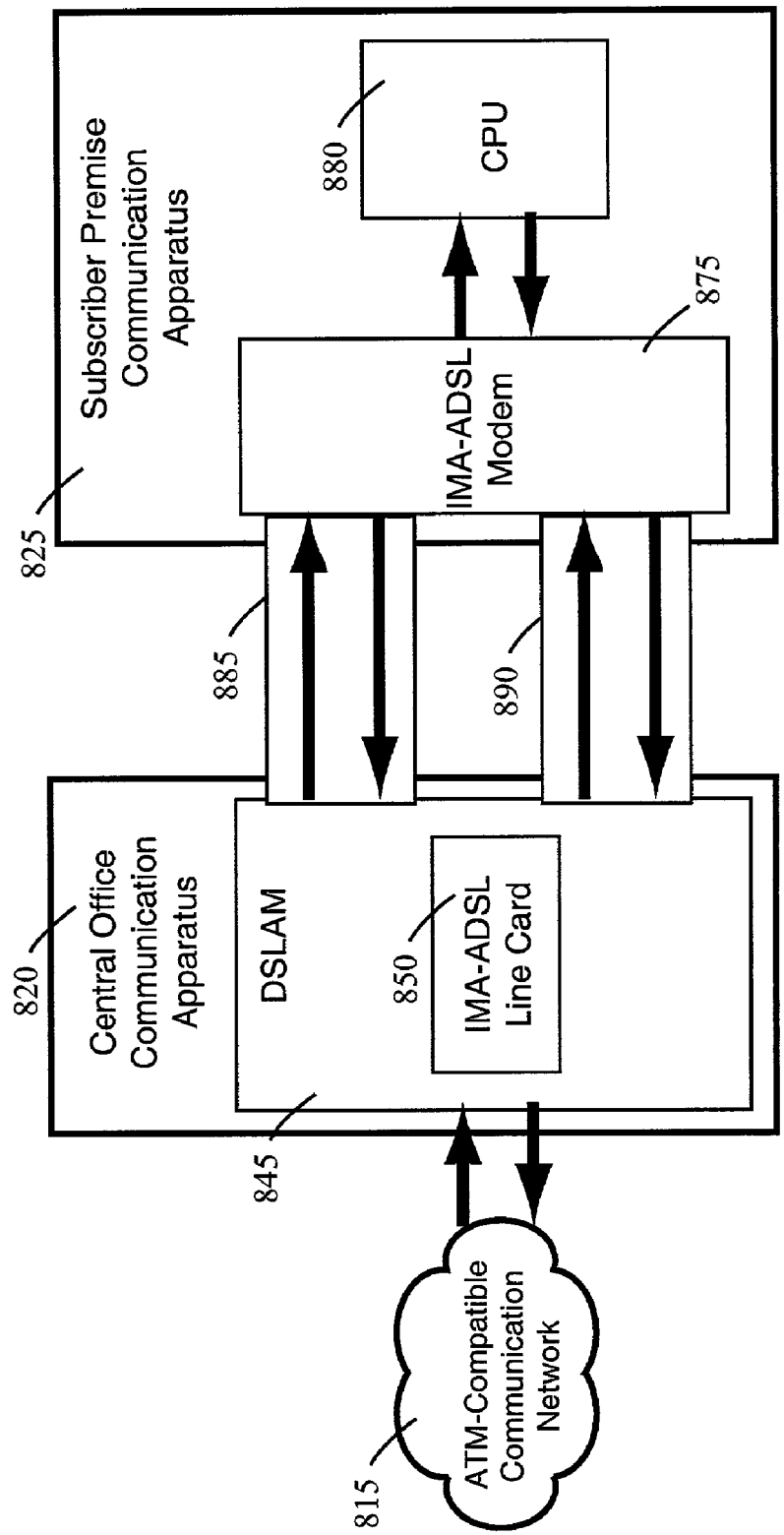
FIG. 12 is a block diagram depicting an embodiment of a plurality of IM communication links between the central office communication apparatus and subscriber premise apparatus depicted in FIG. 11.

Referring to FIG. 12, the IMA-ADSL line card 850 and the IMA-ADSL modem 870 are disclosed herein to be capable of enabling IMA functionality in an ADSL environment via ADSL communication links having disparate downstream and/or upstream data transmission rates. The IMA-ADSL line card 850 and the IMA-ADSL modem 870 are examples of IMA communication devices. The first and the second paired conductor transmission lines 830, 831 serve to establish a first inverse multiplexing (IM) communication link 885 and a second IM communication link 890, respectively, between the DSLAM 845 and the IMA-ADSL modem 870. Each one of the IM communication links 885, 890 is capable of transmitting data in an upstream direction toward the ATM communication network 815 and/or a downstream direction toward the data processing device 875.

Although only two IM communication links are depicted herein, it is contemplated herein and will be understood by one of ordinary skill in the art that an IM group in accordance with an embodiment of the disclosures herein will include two or more IM communication links. Accordingly, n-pairs of paired conductor transmission lines are required when n ADSL IM communication links are bonded into an IM group.

It is contemplated herein that, in one embodiment of the disclosures made herein, the DSLAM 845 includes more than one IMA-ADSL line card 850. Each line card 850 is associated with a different subscriber premise communication apparatus. In this manner, the DSLAM 845 may provide IMA functionality to a plurality of subscriber premise communication apparatuses. In addition, a line card may have one or more IMA groups that could combine line card ports into a specific IMA grouping to provide multiple IMA functionality to a communication apparatus. For example, a line card with 12 ADSL ports could have an IMA grouping of 4 connected to one communications apparatus and another IMA grouping of 8 connected to a different communications apparatus. Both of these communications apparatuses may be located at the same or different physical locations.

Referring now to data processor programs in accordance with an embodiment of the disclosures made herein, a first data processor program controls at least a portion of the operations associated with the originating endpoint IMA-ADSL communication device and a second data processor program controls at least a portion of the operations associated with the destination endpoint IMA-ADSL communication device. In this manner, the first and the second data processor programs control at least a portion of the operations necessary to properly transmit data across the plurality of IM communication links. The term data processor program is defined herein to refer to computer software, data processor algorithms or any other type of instruction code capable of controlling operations associated with a data processor.

In one embodiment of the first and the second data processor programs, such data processor programs provide their respective functionality between a DSL layer and an ATM layer of the corresponding IMA-ADSL communication device. The first and the second data processor programs are processible by a data processor of the corresponding IMA-ADSL communication device. The first and the second data processor programs may be resident on the corresponding IMA-ADSL communication device or may be accessible by the corresponding IMA-ADSL communication device from an apparatus such as a diskette, a compact disk, a network storage device, a component of a communication system or other suitable apparatus. In at least one embodiment of a communication apparatus, the communication apparatus includes a communication device such as an IMA-ADSL communication device (e.g. a modem, line card, etc).

A data processor program accessible from an apparatus by a data processor is defined herein as a data processor program product. It is contemplated herein that the data processor program product may comprise more than one data processor programs accessible from respective apparatuses. It is further contemplated herein that each one of a plurality of data processor programs may be accessed by a different respective one of a plurality of data processors. For example, a first data processor and a second data processor may access a first data processor program and a second data processor program, respectively, from a first apparatus and a second apparatus, respectively.

As disclosed herein, IMA is capable of being facilitated via communication links having disparate upstream and/or downstream data transmission rates. Such facilitation of IMA is advantageous because it is common for data communication links, such as ADSL communication links, to not synchronize at the same upstream and/or downstream data transmission rate. Accordingly, the inverse multiplexing techniques disclosed herein provide significant advantages relative to the conventional inverse multiplexing techniques.

Utilizing the IMA techniques disclosed herein, a first ADSL communication link is combined with one or more additional ADSL communication links that have disparate upstream and/or downstream data transmission rates relative to the first ADSL communication link. The result is a group of physically lower speed ADSL communication links that behave identically to a single point-to-point high-speed communication link of the same capacity as the group of lower speed ADSL communication links. In this manner, increased data transmission rates can be achieved when cost or technical feasibility prevents deployment of a single high-speed point-to-point communication link. It is contemplated that the methods, systems and apparatuses disclosed herein may be useful with data communication links that have disparate data transmission rates, other than ADSL communication links.

The transient behavior of the links during times of link speed changes is simplified because the sequence number provides a reliable method to accurately reorder cells that is independent of links speed and delay. Under the new approach, if the bit rate of any one of the links in a group must be decreased or increased, the change may be performed independently of the other links and without disruption of service to the subscriber. The new approach is not constrained by changing bit rates of individual links within a bonded group as member links may operate at their optimal speed regardless of the instantaneous speed of the other links. Accordingly, the complexity of establishing a bonded group is reduced because there is no longer a requirement to measure differential link speed or to confirm that links are operating at precisely the same bit rate.

Furthermore, the new approach is not restricted by differential delay between members of the group, other than by the depth of the buffers that have been implemented at the transmitter and receiver ends. It is preferred to try to minimize the delay across any one link. However, the receiver buffer may be sized to accommodate any differential delay. In this manner, adverse affects associated with differential delay are reduced.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in many manners without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating inverse multiplexing (IM) over asynchronous transfer mode, comprising:
   receiving a stream of sequentially aligned ATM cells via an originating end point logical communication link;
   associating a sequence identifier with each one of said ATM cells for creating sequence-identified ATM cells including determining a sequence code for each one of said ATM cells and inserting the sequence code for each one of said ATM cells into a header portion of a corresponding one of said ATM cells and identifying when a particular sequence identifier results in a header portion bit value that corresponds to a reference bit value designating a reference function;

holding a first portion and a second portion of said sequence-identified ATM cells in a first transmitter queue and a second transmitter queue, respectively, wherein the first transmitter queue and the second transmitter queue are associated with a first one and a second one, respectively, of a plurality of IM communication links; and sequentially forwarding said sequence-identified ATM cells from each said queue over said associated one of the plurality of IM communication links, wherein the first one of the plurality of IM communication links has a data transmission rate disparate in at least one data transmission direction with respect to a data transmission rate of the second one of the plurality of IM communication links.

2. The method of claim 1 wherein:

receiving the stream of sequentially aligned ATM cells includes receiving the stream of sequentially aligned ATM cells at a transmitter queue selector; and the transmitter queue selector is capable of enabling the first portion and the second portion of said sequence-identified ATM cells to be added to the first transmitter queue and the second transmitter queue, respectively.

3. The method of claim 1 wherein associating the sequence identifier with each one of said ATM cells includes determining a sequence code for each one of said ATM cells and inserting the sequence code for each one of said ATM cells into an information payload portion of a corresponding one of said ATM cells.

4. The method of claim 1 wherein associating the sequence identifier with each one of said ATM cells includes identifying at least one of unused addressing bits and unused address space within the header portion of the corresponding one of said ATM cells and redefining said at least one of unused addressing bits and unused address space to designate the sequence identifier.

5. The method of claim 1, further comprising:

preventing the particular sequence identifier from being associated with any one of said ATM cells.

6. The method of claim 1 wherein associating the sequence identifier with each one of said ATM cells includes determining the sequence identifier for each one of said ATM cells in response to each one of said ATM cells arriving at a transmitter queue selector.

7. The method of claim 1, further comprising:

specifying a cell capacity of the first transmitter queue and a cell capacity of the second transmitter queue, wherein the cell capacity of the first transmitter queue and the cell capacity of the second transmitter queue are based on a reference data transmission rate of the first one of the plurality of IM communication links and to a reference data transmission rate of the second one of the plurality of IM communication links, respectively.

8. The method of claim 7 wherein:

the cell capacity of the first queue and the cell capacity of the second queue are different; and an approximately common time period is required for transmitting a number of cells equal to the cell capacity of the first queue and a number of cells equal to the cell capacity of the second queue across the first one of the plurality of IM communication links and the second one of the plurality of IM communication links, respectively.

9. The method of claim 8 wherein holding the first portion and the second portion of said sequence-identified ATM cells in the first transmitter queue and the second transmitter queue, respectively, includes directing a next one of the sequence-identified ATM cells to a most empty one of the first transmitter queue and the second transmitter queue.

10. The method of claim 9 wherein holding the first portion and the second portion of said sequence-identified ATM cells in the first transmitter queue and the second transmitter queue, respectively, includes directing a previous one of the sequence-identified ATM cells to one of the first transmitter queue and the second transmitter queue and directing the next one of the sequence-identified ATM cells to a next transmitter queue with respect to said one of the first transmitter queue and the second transmitter queue.

11. The method of claim 1 wherein forwarding said sequence-identified ATM cells in a distributed manner over a plurality IM communication links includes forwarding said sequence-identified cells over a plurality of IM-ADSL communication links.

12. The method of claim 11 wherein:

a first one of said IM-ADSL communication links is synchronized at a first upstream data transmission rate; and a second one of said IM-ADSL communication links is synchronized at a second upstream data transmission rate different than the first upstream data transmission rate.

13. The method of claim 11 wherein:

a first one of said IM-ADSL communication links is synchronized at a first downstream data transmission rate; and a second one of said IM-ADSL communication links is synchronized at a second downstream data transmission rate different than the first downstream data transmission rate.

14. The method of claim 11 wherein:

a first one of said IM-ADSL communication links is synchronized at a first downstream data transmission rate and at a first upstream data transmission rate; and a second one of said IM-ADSL communication links is synchronized at a second downstream data transmission rate different than the first downstream data transmission rate and at a second upstream data transmission rate different than the first upstream data transmission rate.

15. The method of claim 1, further comprising:

receiving at least a portion of said sequence-identified ATM cells; and forwarding an aligned stream of inversely multiplexed ATM cells from the receiver across a destination endpoint logical communication link.

16. The method of claim 15 wherein receiving said sequence-identified ATM cells includes holding at least a portion of said sequence-identified ATM cells in a receiver queue.

17. The method of claim 16, further comprising:

determining a receiver queue position associated with each one of said sequence-identified ATM cells in response to receiving each one of said sequence-identified ATM cells.

18. The method of claim 16 wherein forwarding the aligned stream of inversely multiplexed ATM cells includes sequentially retrieving said sequence-identified ATM cells from the receiver queue.

19. The method of claim 17 wherein sequentially retrieving said sequence-identified ATM cells includes identifying a next one of said sequence-identified ATM cells to forward.

20. The method of claim 19 wherein identifying the next one of the sequence-identified ATM cells includes determining the sequence identifier associated with the next one of the sequence-identified ATM cell.

21. The method of claim 17 wherein sequentially retrieving said sequence-identified ATM cells includes:
  delaying forwarding of a received one of said sequence-identified ATM cells being held in the receiver queue in response to determining that the next one of said sequence-identified ATM cells is missing from an expected position in the receiver queue;
  discontinuing attempts to retrieve the next one of said sequence-identified ATM cells after a prescribed time period elapses while the next one of said sequence-identified ATM cells remains missing from the expected positioning the receiver queue; and
  retrieving the next one of said sequence-identified ATM cells before the prescribed time period elapses in response to determining that the next one of said sequence-identified ATM cells is located in the expected position in the receiver queue after having initially determined tat the next one of said sequence-identified ATM cells was missing from an expected position in the receiver queue.

22. The method of claim 21 wherein forwarding the aligned stream of inversely multiplexed ATM cells from the receiver includes:
  forwarding the received one of said sequence-identified ATM cells after the prescribed time period elapses in response to the next one of said sequence-identified ATM cells remains missing from the expected positioning the receiver queue after the prescribed time period elapses; and
  forwarding the next one of said sequence-identified ATM cells in response to retrieving the next one of said sequence-identified ATM cells before the prescribed time period elapses and after having initially determined that the next one of said sequence-identified ATM cells was missing from an expected position in the receiver queue.

23. A method for facilitating inverse multiplexing over asynchronous transfer mode, comprising:
  receiving a stream of sequentially aligned ATM cells via an originating end point logical communication link, wherein the stream of sequentially aligned ATM cells is received at a transmitter queue selector and the transmitter queue selector is capable of enabling the first portion and the second portion of said sequence-identified ATM cells to be added to the first transmitter queue and the second transmitter queue, respectively;
  associating a sequence identifier with each one of said ATM cells for creating sequence-identified ATM cells, wherein associating the sequence identifier with each one of said ATM cells includes identifying when a particular sequence identifier results in a header portion bit value that corresponds to a reference bit value designating a reference function and preventing the particular sequence identifier from being associated wit any one of said ATM cells;
  specifying a cell capacity of a first transmitter queue and a cell capacity of a second transmitter queue, wherein the cell capacity of the first transmitter queue and the cell capacity of the second transmitter queue are based on a reference data transmission rate of the first one of the plurality of IM communication links and to a reference data transmission rate of the second one of the plurality of IM communication links, respectively;
  holding a first portion and a second portion of said sequence-identified ATM cells in the first transmitter queue and the second transmitter queue, respectively, wherein the first transmitter queue and the second transmitter queue are associated with a first one and a second one, respectively, of a plurality of IM communication links;
  sequentially forwarding said sequence-identified ATM cells from each said queue over said associated one of the plurality of IM communication links, wherein the first one of the plurality of IM communication links has a data transmission rate disparate in at least one data transmission direction with respect to a data transmission rate of the second one of the plurality of JIM communication links;
  receiving at least a portion of said sequence-identified ATM cells by a receiver;
  determining a receiver queue position associated with each one of said sequence-identified ATM cells in response to receiving each one of said sequence-identified ATM cells; and
  forwarding an aligned stream of inversely multiplexed ATM cells from the receiver across a destination endpoint logical communication link.

24. The method of claim 23 wherein associating the sequence identifier with each one of said ATM cells includes determining a sequence code for each one of said ATM cells and inserting the sequence code for each one of said ATM cells into a header portion of a corresponding one of said ATM cells.

25. The method of claim 24 wherein associating the sequence identifier with each one of said ATM cells includes identifying at least one of unused addressing bits and unused address space within the header portion of the corresponding one of said ATM cells and redefining said at least one of unused addressing bits and unused address space to designate the sequence identifier.

26. The method of claim 23 wherein associating the sequence identifier with each one of said ATM cells includes determining the sequence identifier for each one of said ATM cells in response to each one of said ATM cells arriving at a transmitter queue selector.

27. The method of claim 23 wherein:
  the cell capacity of the first queue and the cell capacity of the second queue are different; and
  an approximately common time period is required for transmitting a number of cells equal to the cell capacity of the first queue and a number of cells equal to the cell capacity of the second queue across the first one of the plurality of IM communication links and the second one of the plurality of IM communication links, respectively.

28. The method of claim 27 wherein holding the first portion and the second portion of said sequence-identified ATM cells in the first transmitter queue and the second transmitter queue, respectively, includes directing a next one of the sequence-identified ATM cells to a most empty one of the first transmitter queue and the second transmitter queue.

29. The method of claim 28 wherein holding the first portion and the second portion of said sequence-identified ATM cells in the first transmitter queue and the second transmitter queue, respectively, includes directing a previous one of the sequence-identified ATM cells to one of the first transmitter queue and the second transmitter queue and directing the next one of the sequence-identified ATM cells to a next transmitter queue with respect to said one of the first transmitter queue and the second transmitter queue.

30. The method of claim 23 wherein receiving said sequence-identified ATM cells includes holding at least a portion of said sequence-identified ATM cells in a receiver queue.

31. The method of claim 23 wherein forwarding the aligned stream of inversely multiplexed ATM cells includes sequentially retrieving said sequence-identified ATM cells from the receiver queue.

32. The method of claim 31 wherein sequentially retrieving said sequence-identified ATM cells includes identifying a next one of said sequence-identified ATM cells to forward.

33. The method of claim 32 wherein identifying the next one of the sequence-identified ATM cells includes determining the sequence identifier associated with the next one of the sequence-identified ATM cell.

34. The method of claim 31 wherein sequentially retrieving said sequence-identified ATM cells includes:
 delaying forwarding of a received one of said sequence-identified ATM cells being held in the receiver queue in response to determining that the next one of said sequence-identified ATM cells is missing from an expected position in the receiver queue;
 discontinuing attempts to retrieve the next one of said sequence-identified ATM cells after a prescribed time period elapses while the next one of said sequence-identified ATM cells remains missing from the expected positioning the receiver queue; and
 retrieving the next one of said sequence-identified ATM cells before the prescribed time period elapses in response to determining that the next one of said sequence-identified ATM cells is located in the expected position in the receiver queue after having initially determined that the next one of said sequence-identified ATM cells was missing from an expected position in the receiver queue.

35. The method of claim 34 wherein forwarding the aligned stream of inversely multiplexed ATM cells from the receiver includes:
 forwarding the received one of said sequence-identified ATM cells after the prescribed time period elapses in response to the next one of said sequence-identified ATM cells remains missing from the expected positioning the receiver queue after the prescribed time period elapses; and
 forwarding the next one of said sequence-identified ATM cells in response to retrieving the next one of said sequence-identified ATM cells before the prescribed time period elapses and after having initially determined that the next one of said sequence-identified ATM cells was missing from an expected position in the receiver queue.

36. A data processor program product, comprising:
 a first data processor program processable by a first data processor;
 a first apparatus from which the first data processor program is accessible by the first data processor; and
 the first data processor program being capable of enabling the first data processor to facilitate:
  receiving a stream of sequentially aligned ATM cells via an originating end point logical communication link;
  associating a sequence identifier with each one of said ATM cells for creating sequence-identified ATM cells;
  holding a first portion and a second portion of said sequence-identified ATM cells in a first transmitter queue and a second transmitter queue, respectively, wherein the first transmitter queue and the second transmitter queue are associated with a first one and a second one, respectively, of a plurality of IM communication links;
  specifying a cell capacity of the first transmitter queue and a cell capacity of the second transmitter queue, wherein the cell capacity of the first transmitter queue and the cell capacity of the second transmitter queue are based on a reference data transmission rate of the first one of the plurality of IM communication links and to a reference data transmission rate of the second one of the plurality of IM communication links, respectively; and
  sequentially forwarding said sequence-identified ATM cells from each said queue over said associated one of the plurality of IM communication links, wherein the first one of the plurality of IM communication links has a data transmission rate disparate in at least one data transmission direction with respect to a data transmission rate of the second one of the plurality of IM communication links.

37. The data processor program product of claim 36 wherein:
 enabling the first data processor to facilitate receiving the stream of sequentially aligned ATM cells includes enabling the first data processor to facilitate receiving the stream of sequentially aligned ATM cells at a transmitter queue selector; and
 the transmitter queue selector is capable of enabling the first portion and the second portion of said sequence-identified ATM cells to be added to the first transmitter queue and the second transmitter queue, respectively.

38. The data processor program product of claim 36 wherein enabling the first data processor to facilitate associating the sequence identifier with each one of said ATM cells includes enabling the first data processor to facilitate determining a sequence code for each one of said ATM cells and to facilitate inserting the sequence code for each one of said ATM cells into an information payload portion of a corresponding one of said ATM cells.

39. The data processor program product of claim 36 wherein enabling the first data processor to facilitate associating the sequence identifier with each one of said ATM cells includes enabling the first data processor to facilitate determining a sequence code for each one of said ATM cells and to facilitate inserting the sequence code for each one of said ATM cells into a header portion of a corresponding one of said ATM cells.

40. The data processor program product of claim 39 wherein enabling the first data processor to facilitate associating the sequence identifier with each one of said ATM cells includes enabling the first data processor to facilitate identifying at least one of unused addressing bits and unused address space within the header portion of the corresponding one of said ATM cells and to facilitate redefining said at least one of unused addressing bits and unused address space to designate the sequence identifier.

41. The data processor program product of claim 39 wherein enabling the first data processor to facilitate associating the sequence identifier with each one of said ATM cells includes enabling the first data processor to facilitate identifying when a particular sequence identifier results in a header portion bit value that corresponds to a reference bit value designating a reference function.

42. The data processor program product of claim 41 wherein the first data processor program is further capable of enabling the first data processor to facilitate:

preventing the particular sequence identifier from being associated with any one of said ATM cells.

43. The data processor program product of claim 36 wherein enabling the first data processor to facilitate associating the sequence identifier with each one of said ATM cells includes enabling the first data processor to facilitate determining the sequence identifier for each one of said ATM cells in response to each one of said ATM cells arriving at a transmitter queue selector.

44. The data processor program product of claim 36 wherein:

the cell capacity of the first queue and the cell capacity of the second queue are different; and an approximately common time period is required for transmitting a number of cells equal to the cell capacity of the first queue and a number of cells equal to the cell capacity of the second queue across the first one of the plurality of IM communication links and the second one of the plurality of IM communication links, respectively.

45. The data processor program product of claim 44 wherein enabling the first data processor to facilitate holding the first portion and the second portion of said sequence-identified ATM cells in the first transmitter queue and the second transmitter queue, respectively, includes enabling the first data processor to facilitate directing a next one of the sequence-identified ATM cells to a most empty one of the first transmitter queue and the second transmitter queue.

46. The data processor program product of claim 45 wherein enabling the first data processor to facilitate holding the first portion and the second portion of said sequence-identified ATM cells in the first transmitter queue and the second transmitter queue, respectively, includes enabling the first data processor to facilitate directing a previous one of the sequence-identified ATM cells to one of the first transmitter queue and the second transmitter queue and directing the next one of the sequence-identified ATM cells to a next transmitter queue with respect to said one of the first transmitter queue and the second transmitter queue.

47. The data processor program product of claim 36 wherein enabling the first data processor to facilitate forwarding said sequence-identified ATM cells in a distributed manner over a plurality IM communication links includes enabling the first data processor includes forwarding said sequence-identified cells over a plurality of IM-ADSL communication links.

48. The data processor program product of claim 47 wherein:

a first one of said IM-ADSL communication links is synchronized at a first upstream data transmission rate; and a second one of said IM-ADSL communication links is synchronized at a second upstream data transmission rate different than the first upstream data transmission rate.

49. The data processor program product of claim 47 wherein:

a first one of said IM-ADSL communication links is synchronized at a first downstream data transmission rate; and a second one of said IM-ADSL communication links is synchronized at a second downstream data transmission rate different than the first downstream data transmission rate.

50. The data processor program product of claim 47 wherein:

a first one of said IM-ADSL communication links is synchronized at a first downstream data transmission rate and at a first upstream data transmission rate; and a second one of said IM-ADSL communication links is synchronized at a second downstream data transmission rate different than the first downstream data transmission rate and at a second upstream data transmission rate different than the first upstream data transmission rate.

51. The data processor program product of claim 36, further comprising:

a second data processor program processable by a second data processor;

a second apparatus from which the second data processor program is accessible by the second data processor; and the second data processor program being capable of enabling the second data processor to facilitate:

receiving at least a portion of said sequence-identified ATM cells; and forwarding an aligned stream of inversely multiplexed ATM cells from the receiver across a destination endpoint logical communication link.

52. The data processor program product of claim 51 wherein enabling the second data processor to facilitate receiving said sequence-identified ATM cells includes enabling the second data processor to facilitate holding at least a portion of said sequence-identified ATM cells in a receiver queue.

53. The data processor program product of claim 52 wherein the second data processor program is further capable of enabling the second data processor to facilitate: determining a receiver queue position associated with each one of said sequence-identified ATM cells in response to receiving each one of said sequence-identified ATM cells.

54. The data processor program product of claim 52 wherein enabling the data processor to facilitate forwarding the aligned stream of inversely multiplexed ATM cells includes enabling the second data processor to facilitate sequentially retrieving said sequence-identified ATM cells from the receiver queue.

55. The data processor program product of claim 54 wherein enabling the second data processor to facilitate sequentially retrieving said sequence-identified ATM cells includes enabling the second data processor to facilitate identifying a next one of said sequence-identified ATM cells to forward.

56. The data processor program product of claim 55 wherein enabling the second data processor to facilitate identifying the next one of the sequence-identified ATM cells includes enabling the second data processor to facilitate determining the sequence identifier associated with the next one of the sequence-identified ATM cell.

57. The data processor program product of claim 53 wherein enabling the second data processor to facilitate sequentially retrieving said sequence-identified ATM cells includes enabling the second data processor to facilitate:

delaying forwarding of a received one of said sequence-identified ATM cells being held in the receiver queue in response to determining that the next one of said sequence-identified ATM cells is missing from an expected position in the receiver queue;

discontinuing attempts to retrieve the next one of said sequence-identified ATM cells after a prescribed time period elapses while the next one of said sequence-identified ATM cells remains missing from the expected positioning the receiver queue; and retrieving the next one of said sequence-identified ATM cells before the prescribed time period elapses in response to determining that the next one of said sequence-identified ATM cells is located in the expected position in the receiver queue after having initially determined that the next one of said sequence-identified ATM cells was missing from an expected position in the receiver queue.

58. The data processor program product of claim 57 wherein enabling the second data processor to facilitate forwarding the aligned stream of inversely multiplexed ATM cells from the receiver includes enabling the second data processor to facilitate:

forwarding the received one of said sequence-identified ATM cells after the prescribed time period elapses in response to the next one of said sequence-identified ATM cells remains missing from the expected positioning the receiver queue after the prescribed time period elapses; and forwarding the next one of said sequence-identified ATM cells in response to retrieving the next one of said sequence-identified ATM cells before the prescribed time period elapses and after having initially determined that the next one of said sequence-identified ATM cells was missing from an expected position in the receiver queue.

59. A data processor program product, comprising:

a first data processor program processable by a first data processor;

a second data processor program processable by a second data processor;

a first apparatus from which the first data processor program is accessible by the first data processor;

a second apparatus from which the second data processor program is accessible by the second data processor;

the first data processor program being capable of enabling the first data processor to facilitate:

receiving a stream of sequentially aligned ATM cells via an originating end point logical communication link, wherein the stream of sequentially aligned ATM cells is received at a transmitter queue selector and the transmitter queue selector is capable of enabling the first portion and the second portion of said sequence-identified ATM cells to be added to the first transmitter queue and the second transmitter queue, respectively;

associating a sequence identifier with each one of said ATM cells for creating sequence-identified ATM cells, wherein associating the sequence identifier with each one of said ATM cells includes identifying when a particular sequence identifier results in a header portion bit value that corresponds to a reference bit value designating a reference function and preventing the particular sequence identifier from being associated with any one of said ATM cells;

specifying a cell capacity of a first transmitter queue and a cell capacity of a second transmitter queue, wherein the cell capacity of the first transmitter queue and the cell capacity of the second transmitter queue are based on a reference data transmission rate of the first one of the plurality of IM communication links and to a reference data transmission rate of the second one of the plurality of IM communication links, respectively;

holding a first portion and a second portion of said sequence-identified ATM cells in the first transmitter queue and the second transmitter queue, respectively, wherein the first transmitter queue and the second transmitter queue are associated with a first one and a second one, respectively, of a plurality of IM communication links; and sequentially forwarding said sequence-identified ATM cells from each said queue over said associated one of the plurality of IM communication links, wherein the first one of the plurality of IM communication links has a data transmission rate disparate in at least one data transmission direction with respect to a data transmission rate of the second one of the plurality of IM communication links; and the second data processor program being capable of enabling the second data processor to facilitate:

receiving at least a portion of said sequence-identified ATM cells;

determining a receiver queue position associated with each one of said sequence-identified ATM cells in response to receiving each one of said sequence-identified ATM cells; and forwarding an aligned stream of inversely multiplexed ATM cells from the receiver across a destination endpoint logical communication link.

60. An inverse multiplexing capable communication system, comprising:

a first communication apparatus including a first transmitter queue and a second transmitter queue, wherein the first communication apparatus is capable of being coupled between an originating endpoint logical communication link and a plurality of IM communication links; and a first data processor program processable by a first data processor of the first communication apparatus;

the first data processor program being capable of enabling the first communication apparatus to facilitate:

receiving a stream of sequentially aligned ATM cells via the originating end point logical communication link;

associating a sequence identifier with each one of said ATM cells for creating sequence-identified ATM cells;

holding a first portion and a second portion of said sequence-identified ATM cells in the first transmitter queue and the second transmitter queue, respectively, wherein the first transmitter queue and the second transmitter queue are associated with a first one and a second one, respectively, of the plurality of IM communication links;

specifying a cell capacity of the first transmitter queue and a cell capacity of the second transmitter queue, wherein the cell capacity of the first transmitter queue and the cell capacity of the second transmitter queue are based on a reference data transmission rate of the first one of the plurality of IM communication links and to a reference data transmission rate of the second one of the plurality of IM communication links, respectively; and sequentially forwarding said sequence-identified ATM cells from each said queue over said associated one of the plurality of IM communication links, wherein the first one of the plurality of IM communication links has a data transmission rate disparate in at Least one data transmission direction with respect to a data transmission rate of the second one of the plurality of IM communication links.

61. The inverse multiplexing capable communication system of claim 60 wherein:
the first communication apparatus further includes a transmitter queue selector;
enabling the first communication apparatus to facilitate receiving the stream of sequentially aligned ATM cells includes enabling the first communication apparatus to facilitate receiving the stream of sequentially aligned ATM cells at the transmitter queue selector; and
the transmitter queue selector is capable of enabling the first portion and the second portion of said sequence-identified ATM cells to be added to the first transmitter queue and the second transmitter queue, respectively.

62. The inverse multiplexing capable communication system of claim 61 wherein enabling the first communication apparatus to facilitate associating the sequence identifier with each one of said ATM cells includes enabling the first communication apparatus to facilitate determining a sequence code for each one of said ATM cells and to facilitate inserting the sequence code for each one of said ATM cells into an information payload portion of a corresponding one of said ATM cells.

63. The inverse multiplexing capable communication system of claim 61 wherein enabling the first communication apparatus to facilitate associating the sequence identifier with each one of said ATM cells includes enabling the first communication apparatus to facilitate determining a sequence code for each one of said ATM cells and to facilitate inserting the sequence code for each one of said ATM cells into a header portion of a corresponding one of said ATM cells.

64. The inverse multiplexing capable communication system of claim 63 wherein enabling the first communication apparatus to facilitate associating the sequence identifier with each one of said ATM cells includes enabling the first communication apparatus to facilitate identifying at least one of unused addressing bits and unused address space within the header portion of the corresponding one of said ATM cells and to facilitate redefining said at least one of unused addressing bits and unused address space to designate the sequence identifier.

65. The inverse multiplexing capable communication system of claim 63 wherein enabling the first communication apparatus to facilitate associating the sequence identifier with each one of said ATM cells includes enabling the first communication apparatus to facilitate identifying when a particular sequence identifier results in a header portion bit value that corresponds to a reference bit value designating a reference function.

66. The inverse multiplexing capable communication system of claim 65 wherein the first data processor program is further capable of enabling the first communication apparatus to facilitate:
preventing the particular sequence identifier from being associated with any one of said ATM cells.

67. The inverse multiplexing capable communication system of claim 60 wherein:
the first communication apparatus further includes a transmitter selector; and
enabling the first communication apparatus to facilitate associating the sequence identifier with each one of said ATM cells includes enabling the first communication apparatus to facilitate determining the sequence identifier for each one of said ATM cells in response to each one of said ATM cells arriving at the transmitter queue selector.

68. The inverse multiplexing capable communication system of claim 60 wherein:
the cell capacity of the first queue and the cell capacity of the second queue are different; and
an approximately common time period is required for transmitting a number of cells equal to the cell capacity of the first queue and a number of cells equal to the cell capacity of the second queue across the first one of the plurality of IM communication links and the second one of the plurality of IM communication links, respectively.

69. The inverse multiplexing capable communication system of claim 68 wherein enabling the first communication apparatus to facilitate holding the first portion and the second portion of said sequence-identified ATM cells in the first transmitter queue and the second transmitter queue, respectively, includes enabling the first communication apparatus to facilitate directing a next one of the sequence-identified ATM cells to a most empty one of the first transmitter queue and the second transmitter queue.

70. The inverse multiplexing capable communication system of claim 69 wherein enabling the first communication apparatus to facilitate holding the first portion and the second portion of said sequence-identified ATM cells in the first transmitter queue and the second transmitter queue, respectively, includes enabling the first communication apparatus to facilitate directing a previous one of the sequence-identified ATM cells to one of the first transmitter queue and the second transmitter queue and directing the next one of the sequence-identified ATM cells to a next transmitter queue with respect to said one of the first transmitter queue and the second transmitter queue.

71. The inverse multiplexing capable communication system of claim 60, further comprising:
a second communication apparatus capable of being coupled between a destination endpoint logical communication link and the plurality of IM communication links; and
a second data processor program processable by a second data processor of the second communication apparatus;
the second data processor program being capable of enabling the second communication apparatus to facilitate:
receiving at least a portion of said sequence-identified ATM cells; and
forwarding an aligned stream of inversely multiplexed ATM cells from the second communication apparatus across the destination endpoint logical communication link.

72. The inverse multiplexing capable communication system of claim 71 wherein:
the second communication apparatus further includes a receiver queue; and
enabling the second communication apparatus to facilitate receiving said sequence-identified ATM cells includes enabling the second communication apparatus to facilitate holding at least a portion of said sequence-identified ATM cells in the receiver queue.

73. The inverse multiplexing capable communication system of claim 72 wherein the second communication apparatus program is further capable of enabling the second communication apparatus to facilitate:
determining a receiver queue position associated with each one of said sequence-identified ATM cells in response to receiving each one of said sequence-identified ATM cells.

74. The inverse multiplexing capable communication system of claim 72 wherein enabling the data processor to facilitate forwarding the aligned stream of inversely multiplexed ATM cells includes enabling the second communication apparatus to facilitate sequentially retrieving said sequence-identified ATM cells from the receiver queue.

75. The inverse multiplexing capable communication system of claim 74 wherein enabling the second communication apparatus to facilitate sequentially retrieving said sequence-identified ATM cells includes enabling the second communication apparatus to facilitate identifying a next one of said sequence-identified ATM cells to forward.

76. The inverse multiplexing capable communication system of claim 74 wherein enabling the second communication apparatus to facilitate identifying the next one of the sequence-identified ATM cells includes enabling the second communication apparatus to facilitate determining the sequence identifier associated with the next one of the sequence-identified ATM cell.

77. The inverse multiplexing capable communication system of claim 73 wherein enabling the second communication apparatus to facilitate sequentially retrieving said sequence-identified ATM cells includes enabling the second communication apparatus to facilitate:
  delaying forwarding of a received one of said sequence-identified ATM cells being held in the receiver queue in response to determining tat the next one of said sequence-identified ATM cells is missing from an expected position in the receiver queue;
  discontinuing attempts to retrieve the next one of said sequence-identified ATM cells after a prescribed time period elapses while the next one of said sequence-identified ATM cells remains missing from the expected positioning the receiver queue; and
  retrieving the next one of said sequence-identified ATM cells before the prescribed time period elapses in response to determining that the next one of said sequence-identified ATM cells is located in the expected position in the receiver queue after having initially determined that the next one of said sequence-identified ATM cells was missing from an expected position in the receiver queue.

78. The inverse multiplexing capable communication system of claim 77 wherein enabling the second communication apparatus to facilitate forwarding the aligned stream of inversely multiplexed ATM cells from the receiver includes enabling the second communication apparatus to facilitate:
  forwarding the received one of said sequence-identified ATM cells after the prescribed time period elapses in response to the next one of said sequence-identified ATM cells remains missing from the expected positioning the receiver queue after the prescribed time period elapses; and
  forwarding the next one of said sequence-identified ATM cells in response to retrieving the next one of said sequence-identified ATM cells before the prescribed time period elapses and after having initially determined that the next one of said sequence-identified ATM cells was missing from an expected position in the receiver queue.

79. An inverse multiplexing capable communication system, comprising:
  a first communication apparatus including a first transmitter queue and a second transmitter queue, wherein the first communication apparatus is capable of being coupled between an originating endpoint logical communication link and a plurality of IM communication links;
  a second communication apparatus capable of being coupled between a destination endpoint logical communication link and the plurality of IM communication links;
  a first data processor program processable by the first communication apparatus;
  a second data processor program processable by the second communication apparatus;
  the first data processor program being capable of enabling the first communication apparatus to facilitate:
    receiving a stream of sequentially aligned ATM cells via an originating end point logical communication link, wherein the steam of sequentially aligned ATM cells is received at a transmitter queue selector and the transmitter queue selector is capable of enabling the first portion and the second portion of said sequence-identified ATM cells to be added to the first transmitter queue and the second transmitter queue, respectively;
    associating a sequence identifier with each one of said ATM cells for creating sequence-identified ATM cells, wherein associating the sequence identifier with each one of said ATM cells includes identifying when a particular sequence identifier results in a header portion bit value that corresponds to a reference bit value designating a reference function and preventing the particular sequence identifier from being associated with any one of said ATM cells;
    specifying a cell capacity of a first transmitter queue and a cell capacity of a second transmitter queue, wherein the cell capacity of the first transmitter queue and the cell capacity of the second transmitter queue are based on a reference data transmission rate of the first one of the plurality of IM communication links and to a reference data transmission rate of the second one of the plurality of IM communication links, respectively;
    holding a first portion and a second portion of said sequence-identified ATM cells in the first transmitter queue and the second transmitter queue, respectively, wherein the first transmitter queue and the second transmitter queue are associated with a first one and a second one, respectively, of the plurality of IM communication links; and
    sequentially forwarding said sequence-identified ATM cells from each said queue over said associated one of the plurality of IM communication links, wherein the first one of the plurality of IM communication links has a data transmission rate disparate in at least one data transmission direction with respect to a data transmission rate of the second one of the plurality of IM communication links; and
  the second data processor program being capable of enabling the second communication apparatus to facilitate:
    receiving at least a portion of said sequence-identified ATM cells;
    determining a receiver queue position associated with each one of said sequence-identified ATM cells in response to receiving each one of said sequence-identified ATM cells; and
    forwarding an aligned stream of inversely multiplexed ATM cells from the receiver across the destination endpoint logical communication link.

* * * * *